(12) United States Patent
Yamanaka

(10) Patent No.: US 8,830,707 B2
(45) Date of Patent: Sep. 9, 2014

(54) POWER CONVERTER

(75) Inventor: Katsutoshi Yamanaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 116 days.

(21) Appl. No.: 13/369,300

(22) Filed: Feb. 9, 2012

(65) Prior Publication Data

US 2012/0230067 A1 Sep. 13, 2012

(30) Foreign Application Priority Data

Mar. 7, 2011 (JP) .................................. 2011-048592

(51) Int. Cl.
*H02H 7/10* (2006.01)
*H02M 5/293* (2006.01)

(52) U.S. Cl.
CPC .................................... *H02M 5/293* (2013.01)
USPC ............................................................ 363/50

(58) Field of Classification Search
USPC ............ 363/50–53, 55, 56.01, 148, 149, 152, 363/153
See application file for complete search history.

(56) References Cited

U.S. PATENT DOCUMENTS

| | | | | |
|---|---|---|---|---|
| 2,377,152 A | * | 5/1945 | Huge | 307/13 |
| 4,833,583 A | * | 5/1989 | Petitimbert | 363/36 |
| 5,793,628 A | * | 8/1998 | Koch | 363/152 |
| 6,075,425 A | | 6/2000 | Gopfrich et al. | |
| 6,560,132 B1 | * | 5/2003 | Roberts | 363/153 |
| 6,704,215 B2 | * | 3/2004 | Simon | 363/159 |
| 6,744,650 B2 | * | 6/2004 | Mahlein et al. | 363/149 |
| 6,771,524 B2 | * | 8/2004 | Miguchi | 363/149 |
| 6,982,890 B2 | * | 1/2006 | Venkataramanan | 363/171 |
| 7,460,377 B2 | * | 12/2008 | Lacaze | 363/10 |
| 7,701,740 B2 | * | 4/2010 | Yamanaka | 363/149 |
| 7,782,643 B2 | | 8/2010 | Hara et al. | |
| 2003/0179594 A1 | | 9/2003 | Bruckmann et al. | |
| 2009/0059633 A1 | | 3/2009 | Hara et al. | |
| 2012/0051100 A1 | * | 3/2012 | Alexander | 363/37 |

FOREIGN PATENT DOCUMENTS

| | | |
|---|---|---|
| DE | 10024589 | 1/2002 |
| JP | 02-206385 | 8/1990 |
| JP | 2000-069754 | 3/2000 |
| JP | 2008-48550 | 2/2008 |
| WO | WO 2006/112275 | 10/2006 |

OTHER PUBLICATIONS

Extended European Search Report for corresponding EP Application No. 12155102.2-2207, Jul. 5, 2012.
Japanese Office Action for corresponding JP Application No. 2013-153216, May 27, 2014.

* cited by examiner

*Primary Examiner* — Adolf Berhane
(74) *Attorney, Agent, or Firm* — Mori & Ward, LLP

(57) ABSTRACT

This current converter is formed to short-circuit input-side terminals of a plurality of power conversion portions, to parallelly connect output-side terminals of the plurality of power conversion portions with each other and to couple inductors provided on the plurality of power conversion portions respectively with each other, to be capable of performing an operation of moving currents between windings of the coupled inductors on the basis of ON-/OFF-states of pluralities of one-way switches.

20 Claims, 21 Drawing Sheets

FIRST EMBODIMENT

N = ODD NUMBER

N = EVEN NUMBER

FOURTH EMBODIMENT

POWER CONVERTER

CROSS-REFERENCE TO RELATED APPLICATION

The priority application number JP2011-48592, Power Converter, Mar. 7, 2011, Katsutoshi Yamanaka, upon which this patent application is based is hereby incorporated by reference.

BACKGROUND OF THE INVENTION

1. Field of the Invention

The present invention relates to a power converter.

2. Description of the Background Art

WO2006/112275 discloses a matrix converter directly connecting each phase of an AC source and each phase on an output side with each other by a two-way switch and including an input-side reactor connected between each phase of the AC source and the two-way switch, an output-side reactor connected between each phase of a load and the two-way switch, a first capacitor group connecting two-way switch-side terminals of the output-side reactor with each other, a first disconnection circuit capable of disconnecting capacitors constituting the first capacitor group from each other, a second capacitor group connecting two-way switch-side terminals of the input-side reactor with each other, a second disconnection circuit capable of disconnecting capacitors constituting the second capacitor group from each other and a step-up function output outputting a voltage higher than a power supply voltage by short-circuiting a two-way switch side of the input-side reactor with the two-way switch or connecting it to the output side.

SUMMARY OF THE INVENTION

A power converter according to an aspect of the present invention is a power converter receiving an M phase alternating current (M: natural number of at least two) and outputting an N phase alternating current (N: natural number of at least two) and including a plurality of power conversion portions each of which includes a plurality of one-way switches and inductors provided between input-side terminals and the plurality of one-way switches. The input-side terminals of each of the power conversion portions are short-circuited while output-side terminals of the plurality of power conversion portions are parallelly connected with each other, and each of the plurality of power conversion portions has the inductors coupled with each other to perform an operation of moving currents between windings of the coupled inductors on the basis of ON-/OFF-states of the plurality of one-way switches.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a power converter 100 according to a first embodiment of the present invention is described with reference to FIG. 1.

Figure 1:
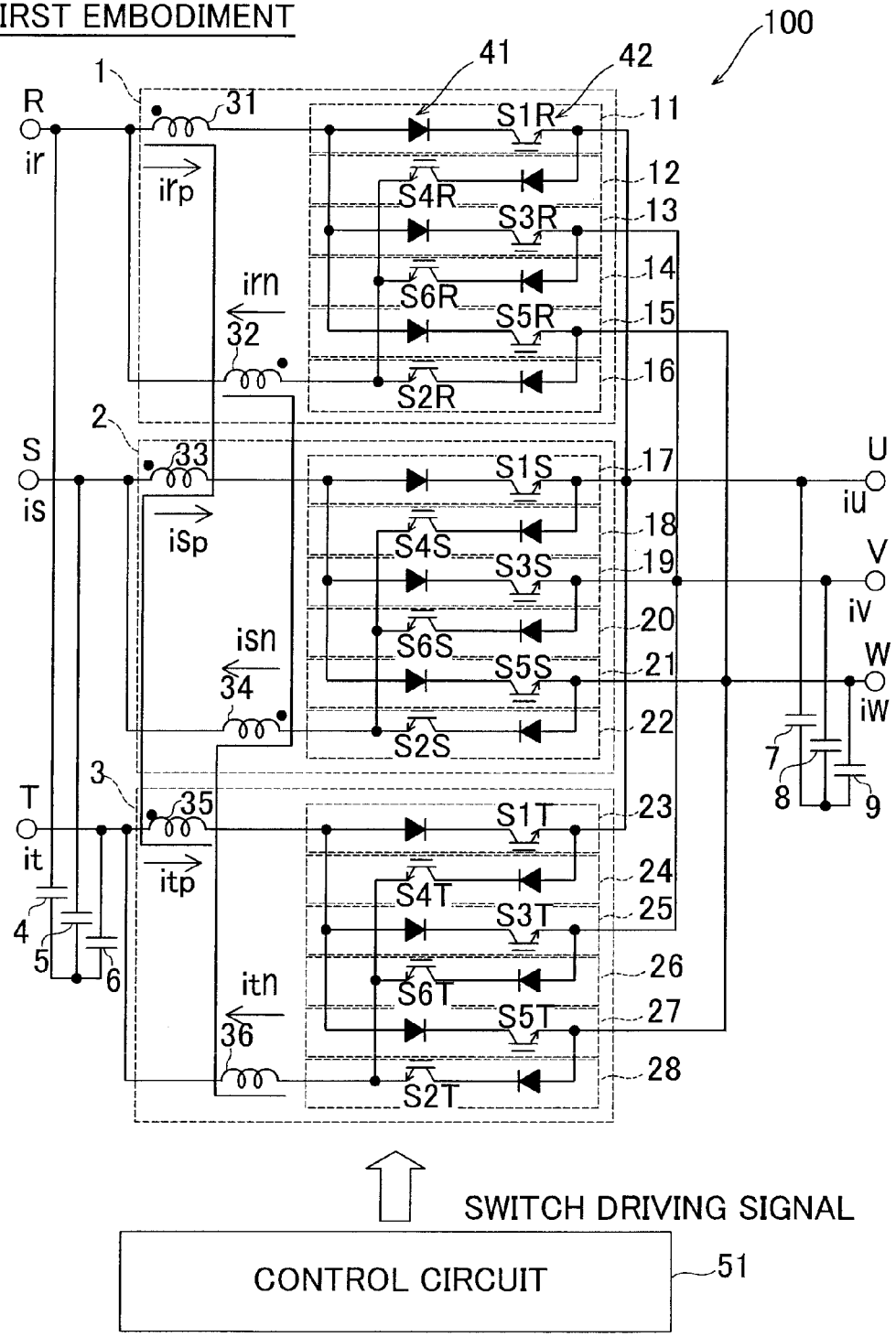
FIG. 1 is a circuit diagram of a power converter according to a first embodiment of the present invention.

As shown in FIG. 1, the power converter 100 according to the first embodiment has an R terminal, an S terminal and a T terminal which are input terminals of a three-phase AC source, a U terminal, a V terminal and a W terminal which are three-phase alternating current output terminals, three power conversion circuits 1, 2 and 3, filter capacitors 4, 5 and 6, filter capacitors 7, 8 and 9 and a control circuit 51. First electrodes of the filter capacitors 4, 5 and 6 are connected to the R, S and T terminals respectively, while second electrodes of the filter capacitors 4, 5 and 6 are connected with each other. First electrodes of the filter capacitors 7, 8 and 9 are connected to the U, V and W terminals respectively, while second electrodes of the filter capacitors 7, 8 and 9 are connected with each other. The power conversion circuits 1 to 3 are examples of the "power conversion portions" in the present invention. The filter capacitors 4, 5 and 6 are examples of the "filter capacitors" in the present invention. The filter capacitors 7, 8 and 9 are examples of the "capacitors" in the present invention.

The power conversion circuit 1 includes six one-way switches 11 to 16 and direct current inductors 31 and 32. The one-way switches 11 to 16 are constituted of diodes 41 and transistors 42 respectively. The one-way switches 11 to 16 are driven by switch driving signals S1R, S4R, S3R, S6R, S5R and S2R respectively. Input-side terminals (R terminal sides of the direct current inductors 31 and 32) of the power conversion circuit 1 are short-circuited. The direct current inductor 31 is provided between the R terminal and the one-way switches 11, 13 and 15. The direct current inductor 32 is provided between the R terminal and the one-way switches 12, 14 and 16.

The power conversion circuit 2 includes six one-way switches 17 to 22 and direct current inductors 33 and 34, which is similar in structure to the power conversion circuit 1. The one-way switches 17 to 22 are driven by switch driving signals S1S, S4S, S3S, S6S, S5S and S2S respectively. Input-side terminals (S terminal sides of the direct current inductors 33 and 34) of the power conversion circuit 2 are short-circuited. The direct current inductor 33 is provided between the S terminal and the one-way switches 17, 19 and 21. The direct current inductor 34 is provided between the S terminal and the one-way switches 18, 20 and 22.

The power conversion circuit 3 includes six one-way switches 23 to 28 and direct current inductors 35 and 36, which is also similar in structure to the power conversion circuit 1. The one-way switches 23 to 28 are driven by switch driving signals S1T, S4T, S3T, S6T, S5T and S2T respectively. Input-side terminals (T terminal sides of the direct current inductors 35 and 36) are short-circuited. The direct current inductor 35 is provided between the T terminal and the one-way switches 23, 25 and 27. The direct current inductor 36 is provided between the T terminal and the one-way switches 24, 26 and 28.

The one-way switches 11, 13, 15, 17, 19, 21, 23, 25 and 27 are examples of the "first one-way switches" in the present invention. The one-way switches 12, 14, 16, 18, 20, 22, 24, 26 and 28 are examples of the "second one-way switches" in the present invention. The direct current inductors 31, 33 and 35 are examples of the "inductors" or the "first inductors" in the present invention. The direct current inductors 32, 34 and 36 are examples of the "inductors" or the "second inductors" in the present invention.

According to the first embodiment, the direct current inductors 31, 33 and 35 are coupled with each other, to form a single inductor in practice. The direct current inductors 32, 34 and 36 are also coupled with each other, to form a single inductor in practice. FIG. 1 shows the coupling directions of the coupled inductors 31 to 36 with black circles. It is assumed that the numbers of turns in windings of the coupled inductors 31 to 36 are equal to each other. Thus, the power converter 100 can perform an operation of moving a current flowing in one winding to another winding among the windings of the coupled inductors 31 to 36 while maintaining the magnitude thereof. This operation is identical to an operation generally known as an operation utilized in a flyback converter of a switching power source or the like. The power converter 100 performs this operation by turning on/off the one-way switches 11 to 28.

Figure 2:
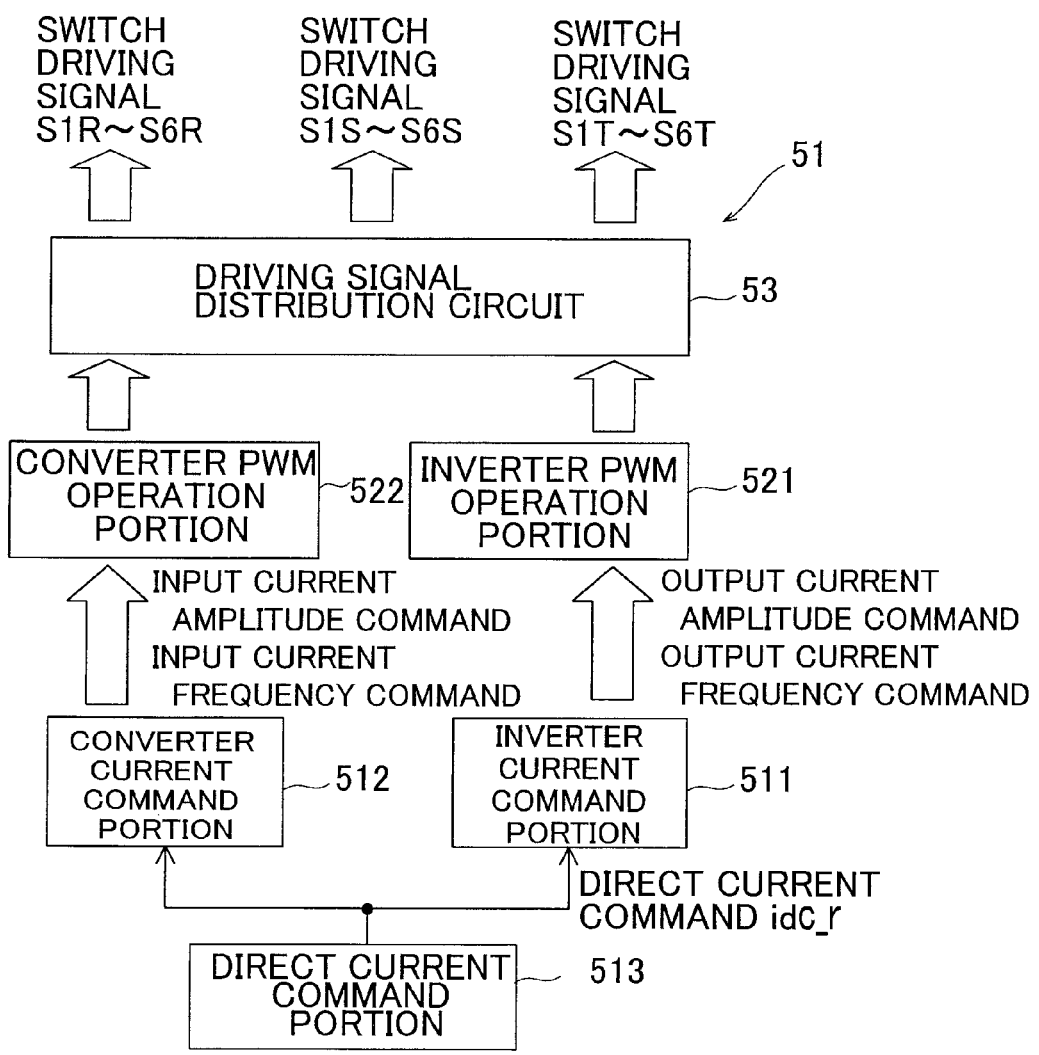
FIG. 2 is a block diagram of a control circuit of the power converter according to the first embodiment of the present invention.

According to the first embodiment, the power converter 100 is provided with the control circuit 51 for controlling ON-/OFF-states of the 18 one-way switches 11 to 28. The control circuit 51 is provided with an inverter current command portion 511 and an inverter PWM calculation portion 521 controlling an inverter portion of a three-phase input three-phase output current type inverter as well as a converter current command portion 512 and a converter PWM calculation portion 522 controlling a converter portion of the three-phase input three-phase output current type converter, as shown in FIG. 2. The control circuit 51 is also provided with a driving signal distribution circuit 53 controlling the one-way switches 11 to 28 by combining (distributing) switch driving signals generated by the inverter PWM calculation portion 521 and the converter PWM calculation portion 522. The control circuit 51 is an example of the "control portion" in the present invention. The inverter current command portion 511 is an example of the "current command portion" or the "first control portion" in the present invention. The inverter PWM calculation portion 521 is an example of the "calculation portion" or the "first control portion" in the present invention. The converter current command portion 512 is an example of the "current command portion" or the "first control portion" in the present invention. The converter PWM calculation portion 522 is an example of the "calculation portion" or the "first control portion" in the present invention. The driving signal distribution circuit 53 is an example of the "second control portion" in the present invention.

The operation principle of the power converter 100 according to the first embodiment is now described with reference to FIGS. 1, 3 and 4.

Figure 3:
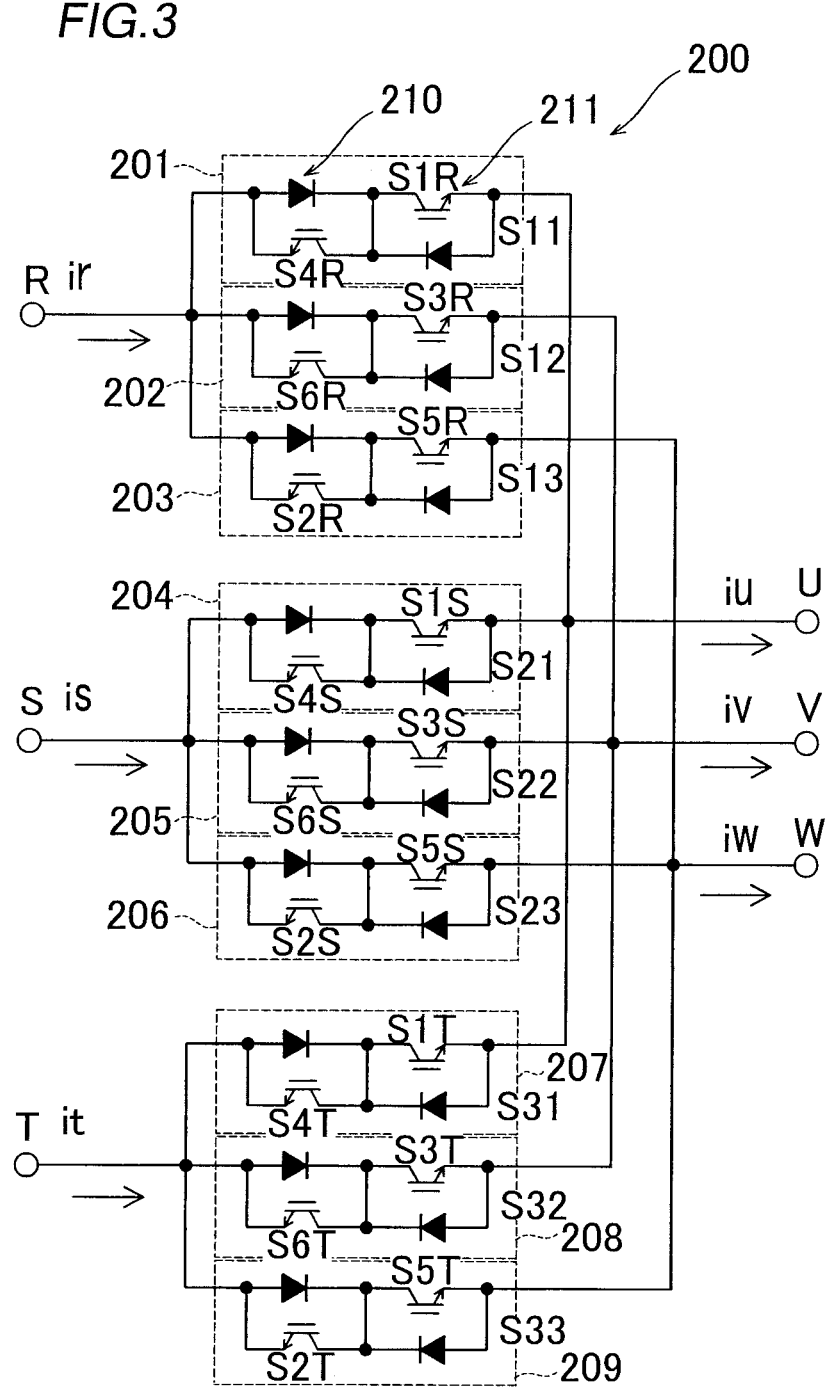
FIG. 3 is a circuit diagram of a two-way switch group of a current type power converter.

A two-way switch group 200 shown in FIG. 3 partially constructs a current type power converter according to a matrix converter, and performs power conversion. The two-way switch group 200 is provided with an R terminal, an S terminal and a T terminal which are input terminals of a three-phase AC source and a U terminal, a V terminal and a W terminal which are three-phase alternating current output terminals. Nine two-way switches 201 to 201 are provided between the R, S and T terminals and the U, V and W terminals. While the R, S and T terminals and the U, V and W terminals are provided with reactors and capacitors capable of being disconnected from each other by switches respectively, FIG. 3 omits the reactors and the capacitors.

Input sides of the two-way switches 201 to 203 are connected to the R terminal. Input sides of the two-way switches 204 to 206 are connected to the S terminal. Input sides of the two-way switches 207 to 209 are connected to the T terminal. Output sides of the two-way switches 201, 204 and 207 are connected to the U terminal. Output sides of the two-way switches 202, 205 and 208 are connected to the V terminal. Output sides of the two-way switches 203, 206 and 209 are connected to the W terminal.

The two-way switches 201 to 209 are driven by switch driving signals S11, S12, S13, S21, S22, S23, S31, S32 and S33 respectively. Input and output currents in and from the two-way switch group 200 become alternating currents having substantially constant amplitudes, due to actions of the aforementioned unshown reactors connected to the input terminals and the output terminals. The following formula (1) expresses the relation between three-phase currents (ir, is and it) and three-phase currents (iu, iv and iw) input in and output from the two-way switch group 200 respectively. Then:

$$\begin{bmatrix} iu \\ iv \\ iw \end{bmatrix} = \begin{bmatrix} S11 & S21 & S31 \\ S12 & S22 & S32 \\ S13 & S23 & S33 \end{bmatrix} \cdot \begin{bmatrix} ir \\ is \\ it \end{bmatrix} \quad (1)$$

The switch driving signals S11, S12, S13, S21, S22, S23, S31, S32 and S33 serve as ON signals when they are "1", and serve as OFF signals when they are "0". It is assumed that the direction from the input terminals (R, S and T terminals) toward the output terminals (U, V and W terminals) is positive.

The two-way switch 201 (202, 203) is formed by antiparallelly connecting a one-way switch consisting of a diode 210 and a transistor 211 driven by the switch driving signal S1R (S3R, S5R) and another one-way switch consisting of another diode 210 and another transistor 211 driven by the switch driving signal S4R (S6R, S2R) with each other. The two-way switch 204 (205, 206) is formed by antiparallelly connecting a one-way switch consisting of a diode 210 and a transistor 211 driven by the switch driving signal S1S (S3S, S5S) and another one-way switch consisting of another diode 210 and another transistor 211 driven by the switch driving signal S4S (S6S, S2S) with each other. The two-way switch 207 (208, 209) is formed by antiparallelly connecting a one-way switch consisting of a diode 210 and a transistor 211 driven by the switch driving signal S1T (S3T, S5T) and another one-way switch consisting of another diode 210 and another transistor 211 driven by the switch driving signal S4T (S6T, S2T) with each other.

Figure 4:
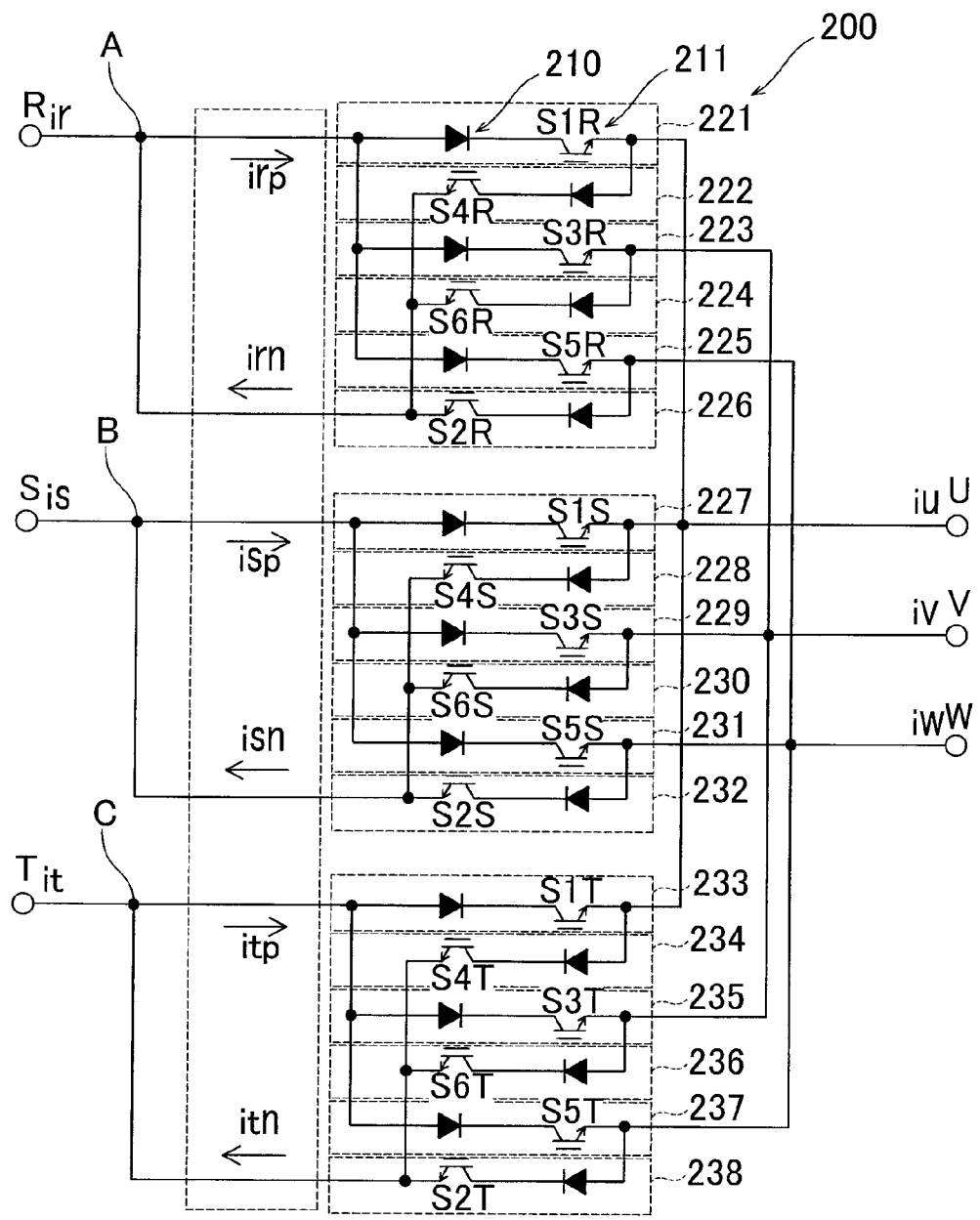
FIG. 4 is a circuit diagram of a power converter electrically equivalent to the power converter shown in FIG. 3.

FIG. 4 shows a circuit electrically equal to that shown in FIG. 3. FIG. 4 shows one-way switches 221 to 238 included in two-way switches 201 to 209 in a separated manner. The following formulas (2) and (3) express the relation between three-phase currents (ir, is and it) and three-phase currents (iu, iv and iw) input in and output from the one-way switches 221 to 238 respectively:

$$\begin{bmatrix} iu \\ iv \\ iw \end{bmatrix} = \begin{bmatrix} S1R & S1S & S1T \\ S3R & S3S & S3T \\ S5R & S5S & S5T \end{bmatrix} \cdot \begin{bmatrix} irp \\ isp \\ itp \end{bmatrix} + \begin{bmatrix} S4R & S4S & S4T \\ S6R & S6S & S6T \\ S2R & S2S & S2T \end{bmatrix} \cdot \begin{bmatrix} irn \\ isn \\ itn \end{bmatrix} \quad (2)$$

$$\begin{bmatrix} ir \\ is \\ it \end{bmatrix} = \begin{bmatrix} irp \\ isp \\ itp \end{bmatrix} + \begin{bmatrix} irn \\ isn \\ itn \end{bmatrix} \quad (3)$$

Switch driving signals S1R to S6R, S1S to S6S and S1T to S6T serve as ON signals when they are "1", and serve as OFF signals when they are "0". Currents irp, isp and itp are direct currents unidirectionally flowing from the input terminals (R, S and T terminals) toward the output terminals (U, V and W terminals). Currents irn, isn and itn are direct currents unidirectionally flowing from the output terminals toward the input terminals. In the current type power converter, input currents are sine waves, and the currents irp, isp and itp are direct currents having half-wave rectification waveforms (positive portions of the sine waves) obtained by positively rectifying the input currents ir, is and it respectively, while the currents irn, isn and itn are direct currents having half-wave rectification waveforms (negative portions of the sine waves) obtained by negatively rectifying the input currents ir, is and it respectively.

Comparing FIGS. 1 and 4 with each other, it is understood that the power converter 100 according to the first embodiment shown in FIG. 1 is obtained by providing the coupled inductors 31 to 36 on passages of the direct currents irp to itn of the two-way switch group 200 constituting the current type power converter shown in FIG. 4 respectively. A current can be moved between closed circuits connected to windings of coupled inductors as described above, and hence the power converter 100 can instantaneously switch states shown in the following formula (4). This means that the power converter 100 regularly feeds a pulsating direct current to any one of the direct current inductors 31, 33 and 35 and regularly feeds another pulsating direct current −idc to any one of the direct current inductors 32, 34 and 36. The power converter 100 implements this by regularly setting any one of S1R, S3R, S5R, S1S, S3S, S5S, S1T, S3T and S5T to "1" and regularly setting any one of S2R, S4R, S6R, S2S, S4S, S6S, S2T, S4T and S6T to "1".

$$\begin{bmatrix} irp \\ isp \\ itp \end{bmatrix} = \begin{bmatrix} idc \\ 0 \\ 0 \end{bmatrix}, \begin{bmatrix} irp \\ isp \\ itp \end{bmatrix} = \begin{bmatrix} 0 \\ idc \\ 0 \end{bmatrix}, \begin{bmatrix} irp \\ isp \\ itp \end{bmatrix} = \begin{bmatrix} 0 \\ 0 \\ idc \end{bmatrix}, \quad (4)$$

$$\begin{bmatrix} irn \\ isn \\ itn \end{bmatrix} = \begin{bmatrix} -idc \\ 0 \\ 0 \end{bmatrix}, \begin{bmatrix} irn \\ isn \\ itn \end{bmatrix} = \begin{bmatrix} 0 \\ -idc \\ 0 \end{bmatrix}, \begin{bmatrix} irn \\ isn \\ itn \end{bmatrix} = \begin{bmatrix} 0 \\ 0 \\ -idc \end{bmatrix}$$

The power converter 100 can render the average of the input current it (is, it) sinusoidal by applying pulse width modulation (PWM) to the states of the above formula (4) thereby varying the time for feeding idc to each winding. In other words, the power converter 100 according to the first embodiment can operate equivalently to the current type power converter by pulsing direct currents flowing in the current type power converter and feeding currents equivalent to those in the current converter by application of PWM, without requiring external reactors and switches.

The operation of the control circuit 51 generating the switch driving signals S1R to S6R, S1S to S6S and S1T to S6T by employing input and output current command vectors with respect to the power converter 100 according to the first embodiment is now described with reference to FIGS. 5 to 10.

The input and output current command vectors are first described with reference to a current type inverter 300 shown in FIG. 5. The current type inverter 300 is provided with a converter portion 301 and an inverter portion 302. Direct current inductors 303 and 304 and a current type inverter control circuit 305 are provided between the converter portion 301 and the inverter portion 302.

The converter portion 301 is provided with one-way switches 311 to 316. The one-way switches 311 to 316 are driven by switch driving signals S4c, S6c, S2c, S1c, S3c and S5c respectively. One-way switches 321 to 326 of the inverter portion 302 are driven by switch driving signals S1i, S3i, S5i, S4i, S6i and S2i respectively.

Figure 5:
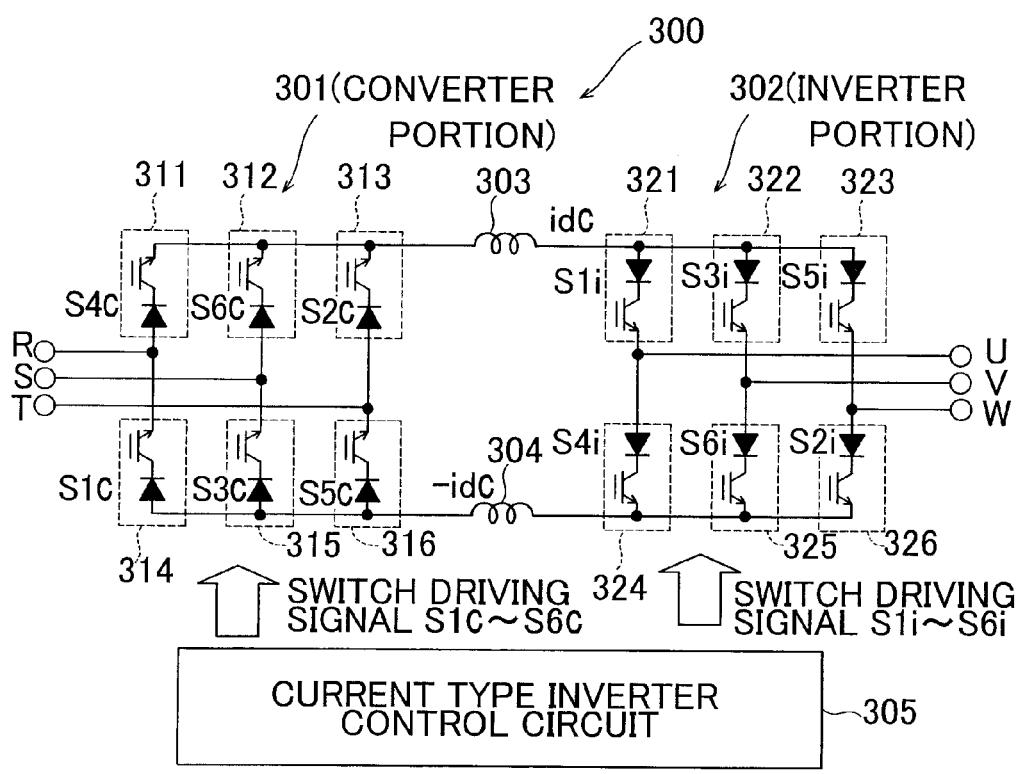
FIG. 5 is a circuit diagram of a three-phase input three-phase output current type inverter.

In the three-phase input three-phase output current type inverter 300, the converter portion 301 performing AC-DC conversion generates a direct current idc from an AC source, and the inverter portion 302 performing DC-AC conversion thereafter converts the direct current idc to an alternating current, as shown in FIG. 5. In this case, the converter portion 301 is controlled to render the direct current idc constant, while the inverter portion 302 is controlled to output an intended current.

Figure 6:
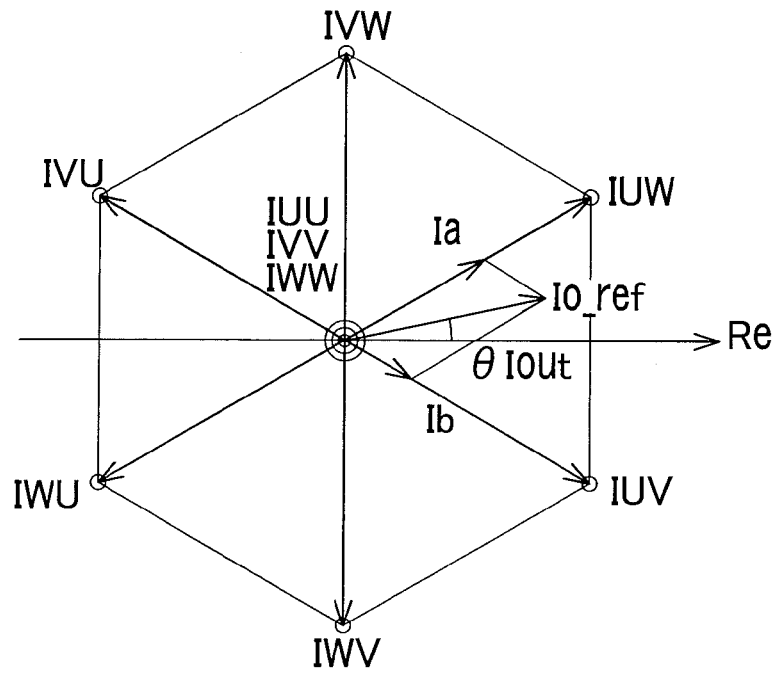
FIG. 6 is a spatial vector diagram of an output side of the power converter according to the first embodiment of the present invention.

As shown in FIG. 6, the inverter portion 302 of the current type inverter 300 performing DC-AC conversion is formed to be capable of outputting three zero current vectors (IUU, IVV and IWW) and six current vectors (IUW, IUV, IWV, IWU, IVU and IVW) each having the magnitude of a direct current command idc_r. More specifically, the inverter portion 302 outputs these vectors by turning on/off one-way switches as shown in Table 1.

TABLE 1

|     | S1i | S2i | S3i | S4i | S5i | S6i |
|-----|-----|-----|-----|-----|-----|-----|
| IUU | ON  | OFF | OFF | ON  | OFF | OFF |
| IUV | ON  | OFF | OFF | OFF | OFF | ON  |
| IUW | ON  | ON  | OFF | OFF | OFF | OFF |
| IVU | OFF | OFF | ON  | ON  | OFF | OFF |
| IVV | OFF | OFF | ON  | OFF | OFF | ON  |
| IVW | OFF | ON  | ON  | OFF | OFF | OFF |
| IWU | OFF | OFF | OFF | ON  | ON  | OFF |
| IWV | OFF | OFF | OFF | OFF | ON  | ON  |
| IWW | OFF | ON  | OFF | OFF | ON  | OFF |

Figure 7:
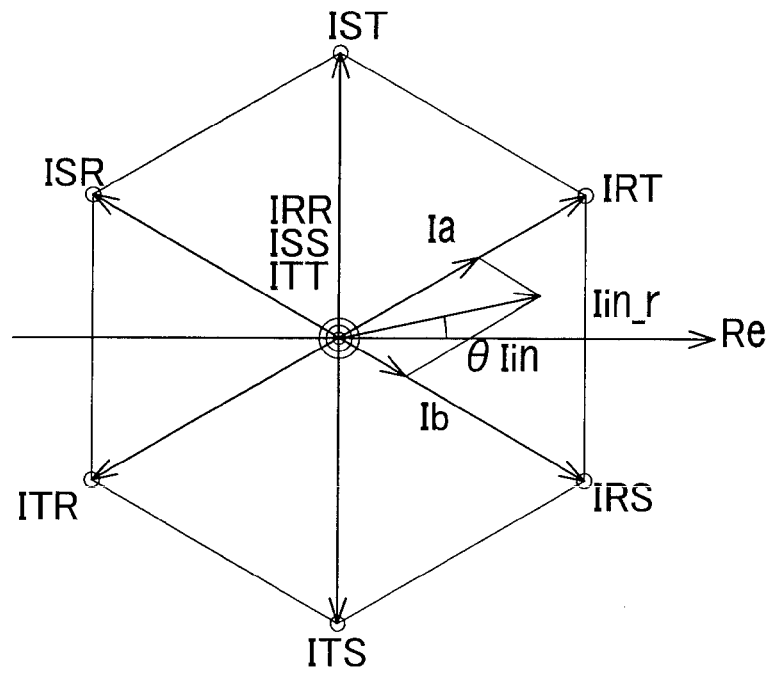
FIG. 7 is a spatial vector diagram of an input side of the power converter according to the first embodiment of the present invention.

As shown in FIG. 7, the converter portion 301 of the current type inverter 300 is also formed to be capable of receiving three zero current vectors (IRR, ISS and ITT) and six nonzero current vectors (IRT, IRS, ITS, ITR, ISR and IST) each having the magnitude of the direct current command idc_r. More specifically, the converter portion 301 receives these vectors by turning on/off one-way switches as shown in Table 2.

TABLE 2

|     | S1c | S2c | S3c | S4c | S5c | S6c |
|-----|-----|-----|-----|-----|-----|-----|
| IRR | ON  | OFF | OFF | ON  | OFF | OFF |
| IRS | OFF | OFF | ON  | ON  | OFF | OFF |
| IRT | OFF | OFF | OFF | ON  | ON  | OFF |
| ISR | ON  | OFF | OFF | OFF | OFF | ON  |
| ISS | OFF | OFF | ON  | OFF | OFF | ON  |
| IST | OFF | OFF | OFF | OFF | ON  | ON  |
| ITR | ON  | ON  | OFF | OFF | OFF | OFF |
| ITS | OFF | ON  | ON  | OFF | OFF | OFF |
| ITT | OFF | ON  | OFF | OFF | ON  | OFF |

As shown in FIG. 2, the control circuit 51 of the power converter 100 includes a direct current command portion 513, and generates the direct current command idc_r as a constant value of at least the amplitude of each output current. Further, the control circuit 51 includes the inverter current command portion 511 and the inverter PWM calculation portion 521, and generates the switch driving signals S1$i$, S3$i$, S5$i$, S4$i$, S6$i$ and S2$i$ for the inverter portion 302 of the current type inverter 300 on the basis of the direct current command idc_r. In addition, the control circuit 51 includes the converter current command portion 512 and the converter PWM calculation portion 522, and generates the switch driving signals S4$c$, S6$c$, S2$c$, S1$c$, S3$c$ and S5$c$ for the converter portion 301 of the current inverter 300. The control circuit 51 further includes the driving signal distribution circuit 53, and generates the switch driving signals S1R to S6R, S1S to S6S and S1T to S6T for the power converter 100 according to the first embodiment from these switch driving signals.

The inverter current command portion 511 generates an output current amplitude command and an output current frequency command (may alternatively be the output current amplitude command and an output current phase command) in response to the characteristics of an alternating load which the power converter 100 drives. When the load is a motor, for example, the inverter current command portion 51 outputs the aforementioned commands according to a vector control rule of an AC motor.

The inverter PWM calculation portion 521 of the control circuit 51 is formed to receive the output current amplitude command and the output current frequency command from the inverter current command portion 511, to generate an output current command vector, and to operate the duration of the output of an actually output current vector. When an output current is a sine wave, the output current command vector rotates in a vector space shown in FIG. 6 at an angular velocity decided by the output current frequency command, and becomes Io_ref in FIG. 6, for example, at a certain moment. The inverter PWM calculation portion 521 equalizes the magnitude of the output current command vector to that of the output current amplitude command, and normalizes the output current command vector as an inverter modulation factor Iout_r. More specifically, the inverter PWM calculation portion 521 normalizes the output current command vector so that the value thereof is 1 when the magnitude of the output current command vector coincides with the radius ($\sqrt{3}/2$ times the direct current command idc_r) of an inscribed circle in the hexagon shown in FIG. 6. Further, the inverter PWM calculation portion 521 obtains a current phase command $\theta$Iout by setting a reference position of the output current command vector Io_ref, integrating the output current frequency command and multiplying the result by $2\pi$ (the inverter PWM calculation portion 521 may directly use the output current phase command when the inverter current command portion 511 generates it). When a phase at which a U-phase current command obtained from the output current command vector Io_ref and the current phase command $\theta$Iout reaches a positive maximum value is set to zero and regarded as a reference phase, for example, the current phase command $\theta$Iout becomes an angle formed by an Re-axis and the output current command vector Io_ref, as shown in FIG. 6. The inverter PWM calculation portion 521 performs PWM by employing one zero current vector and two nonzero current vectors I$_i$ and I$_{i+1}$ adjacent to the output current command vector Io_ref having the inverter modulation factor Iout_r and the phase $\theta$Iout. The PWM decides each of an output time Tz of the zero current vector, an output time T$_i$ of the nonzero current vector I$_i$ and an output time T$_{i+1}$1 of the nonzero current vector I$_{i+1}$ respectively according to the following formulas (5), (6) and (7):

$$T_i = Ts \cdot \text{Iout}\_r \cdot \sin(\pi/3 - \theta_0) \tag{5}$$

$$T_{i+1} = Ts \cdot \text{Iout}\_r \cdot \sin(\theta_0) \tag{6}$$

$$Tz = Ts - T_i - T_{i+1} \tag{7}$$

In the above formulas (5) to (7), $\theta_0$ represents an angle formed by the output current command vector Io_ref and the current vector I$_i$. Ts represents the cycle of PWM control. When the inverter modulation factor Iout_r and the current phase command $\theta$Iout are those shown in FIG. 6, Tz corresponds to an output time of one of the zero current vectors IUU, IVV and IWW, T$_i$ corresponds to an output time of the nonzero current vector IUW, and T$_{i+1}$ corresponds to an output time of the nonzero current vector IUV. $\theta_0$ corresponds to $\pi/6 - \theta$Iout. As a result of the PWM, the inverter PWM calculation portion 521 generates a current vector Ia responsive to the output time $T_i$ and a current vector Ib responsive to the output time $T_{i+1}$.

The converter current command portion 512 generates an input current amplitude command equal to the direct current command idc_r and an input current frequency command equal to the frequency of a power source connected to an input, and generates a command for feeding sinusoidal currents to the input side, for example. Similarly to the inverter PWM calculation portion 521, the converter PWM calculation portion 522 sets a converter modulation factor Iin_r and a current phase command θin with respect to input currents, and controls ON-/OFF-states of switches to select one of three zero current vectors (IRR, ISS and ITT, for example: see FIG. 7) and two of six nonzero current vectors (IRT, IRS, ITS, ITR, ISR and IST). Durations of the states of these six current vectors respectively are set according to formulas obtained by replacing the modulation factor Iout_r with the modulation factor Iin_r for an input current command vector Ii_ref and replacing the current phase command θout with the input current command vector Ii_ref respectively in the above formulas (5) to (7).

The structure of the control circuit 51 of the power converter 100 generating the switch driving signals S1R to S6R, S1S to S6S and S1T to S6T is now described with reference to FIGS. 1 and 5.

The following formula (8) expresses the relation between the three-phase currents (ir, is and it) and the direct currents (idc and −idc) input and output in and from the one-way switches 311 to 316 of the converter portion 301 respectively through the switch driving signals S1c to S6c:

$$\begin{bmatrix} idc \\ -idc \end{bmatrix} = \begin{bmatrix} S4c & S6c & S2c \\ S1c & S3c & S5c \end{bmatrix} \cdot \begin{bmatrix} ir \\ is \\ it \end{bmatrix} \quad (8)$$

The switch driving signals S1c to S6c serve as ON signals when they are "1", and serve as OFF signals when they are "0". The following formula (9) expresses the relation between the direct currents (idc and −idc) input in the one-way switches 321 to 326 and the three-phase currents (iu, iv and iw) output from the inverter portion 302 shown in FIG. 5 through the switch driving signals S1i to S6i:

$$\begin{bmatrix} iu \\ iv \\ iw \end{bmatrix} = \begin{bmatrix} S1i & S4i \\ S3i & S6i \\ S5i & S2i \end{bmatrix} \cdot \begin{bmatrix} idc \\ -idc \end{bmatrix} \quad (9)$$

The switch driving signals S1i to S6i serve as ON signals when they are "1", and serve as OFF signals when they are "0".

The direct current idc flows to any one of the direct current inductors 31, 33 and 35 while the direct current −idc flows to any one of the direct current inductors 32, 34 an 36 in the power converter 100 according to the first embodiment as described above, and hence the following formula (10) expresses the relation between the three-phase currents (ir, is and it) input in the power converter 100 and the direct currents (idc and −idc), similarly to the above formula (8):

$$\begin{bmatrix} idc \\ -idc \end{bmatrix} = \begin{bmatrix} S1R+S3R+S5R & S1S+S3S+S5S & S1T+S3T+S5T \\ S4R+S6R+S2R & S4S+S6S+S2S & S4T+S6T+S2T \end{bmatrix} \cdot \begin{bmatrix} ir \\ is \\ it \end{bmatrix} \quad (10)$$

Any one of S1R, S3R, S5R, S1S, S3S, S5S, S1T, S3T and S5T is regularly "1" while any one of S2R, S4R, S6R, S2S, S4S, S6S, S2T, S4T and S6T is regularly "1" as described above, and hence the following formula (11) expresses the relation between the direct currents (idc and −idc) and the three-phase currents (iu, iv and iw) output from the power converter 100, similarly to the above formula (9):

$$\begin{bmatrix} iu \\ iv \\ iw \end{bmatrix} = \begin{bmatrix} S1R+S1S+S1T & S4R+S4S+S4T \\ S3R+S3S+S3T & S6R+S6S+S6T \\ S5R+S5S+S5T & S2R+S2S+S2T \end{bmatrix} \cdot \begin{bmatrix} idc \\ -idc \end{bmatrix} \quad (11)$$

Considering that the power converter 100 according to the first embodiment converts received three-phase AC power to three-phase AC power different in voltage and frequency and outputs the converted three-phase AC power similarly to the three-phase input three-phase output current type inverter 300, it follows that the relation of the following formula (12) must be satisfied from comparison of the above formulas (8) and (10):

S4c=S1R+S3R+S5R,S6c=S1S+S3S+S5S,S2c=S1T+ S3T+S5T,

S1c=S4R+S6R+S2R,S3c=S4S+S6S+S2S,S5c=S4T+ S6T+S2T, (12)

Similarly, the relation of the following formula (13) must be satisfied from comparison of the above formulas (9) and (11):

S1i=S1R+S1S+S1T,S4i=S4R+S4S+S4T,

S3i=S3R+S3S+S3T,S6i=S6R+S6S+S6T,

S5i=S5R+S5S+S5T,S2i=S2R+S2S+S2T (13)

Comparing the above formulas (12) and (13) with each other, it is understood that the relation of the following formula (14) holds between the switch driving signals of S1R to S6R, S1S to S6S and S1T to S6T of the power converter 100 according to the first embodiment and the switch driving signals of S1c to S6c and S1i to S6i of the current type inverter 300:

S1R=S4c·S1i,S3R=S4c·S3i,S5R=S4c·S5i,

S4R=S1c·S4i,S6R=S1c·S6i,S2R=S1c·S2i,

S1S=S6c·S1i,S3S=S6c·S3i,S5S=S6c·S5i,

S4S=S3c·S4i,S6S=S3c·S6i,S2S=S3c·S2i,

S1T=S2c·S1i,S3T=S2c·S3i,S5T=S2c·S5i,

S4T=S5c·S4i,S6T=S5c·S6i,S2T=S5c·S2i (14)

In other words, the inverter PWM calculation portion 521 of the power converter 100 in the first embodiment decides Si1 to Si6 in the formula (9) on the basis of one zero current vector and two nonzero current vectors and the times Tz, $T_i$ and $T_{i+1}$ while using Table 1, and outputs them to the driving signal distribution circuit 53. The converter PWM calculation portion 522 generates Sc1 to Sc6 of the formula (8) (while using Table 2) and outputs them to the driving signal distribution circuit 53, similarly to the inverter PWM calculation portion 521. The driving signal distribution circuit 53 generates the switch driving signals S1R to S6R, S1S to S6 and S1T to S6T of the power converter 100 through a logical product circuit on the basis of the above formula (14). Consequently, the control circuit 51 drives the power converter 100 on the basis of the switch driving signals of the three-phase input three-phase output current type inverter 300.

Another structure of the driving signal distribution circuit 53 of the control circuit 51 generating the switch driving signals S1R to S6R, S1S to S6S and S1T to S6T is described with reference to FIGS. 8 to 10.

Figure 8:
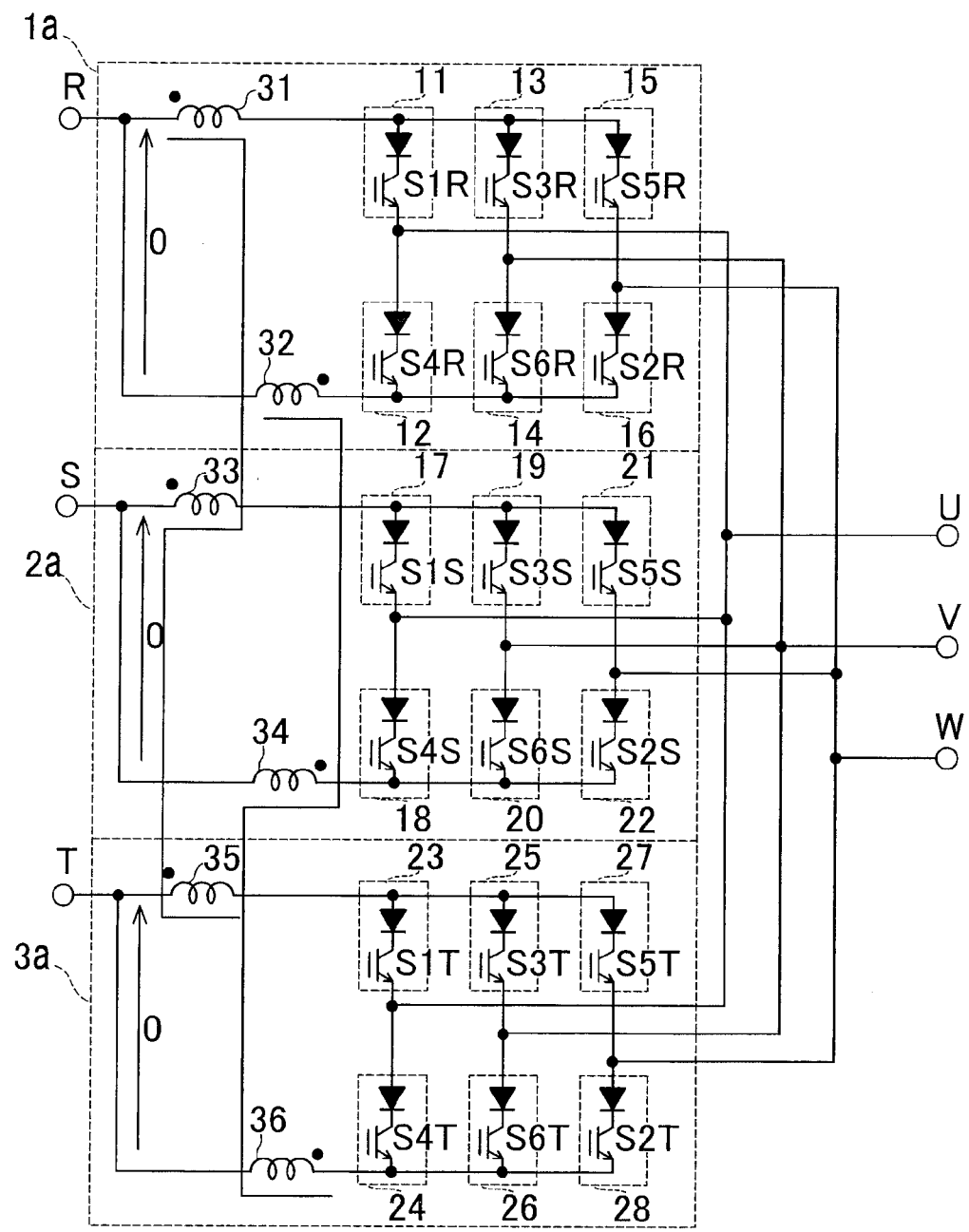
FIG. 8 is a circuit diagram in a case of generating zero current vectors (IRR, ISS and ITT) in the power converter according to the first embodiment of the present invention.

FIG. 8, illustrating a structure electrically identical to that shown in FIG. 1, changes virtual arrangements of the one-way switches 11 to 28 shown in FIG. 1, in order to simplify illustration of zero current vectors. Further, FIG. 8 omits illustration of the filter capacitors 4 to 9 and the control circuit 51. As shown in FIG. 8, a power conversion circuit 1*a* has a circuit structure equivalent to that of a current type inverter having an input state of the zero current vector IRR in which the one-way switches 314 (S1*c*) and 311 (S4*c*) of the current type inverter 300 shown in FIG. 5 are in ON-states and the one-way switches 313 (S2*c*), 315 (S3*c*) and 316 (S5*c*) are in OFF-states. Similarly, a power conversion circuit 2*a* has a circuit structure equivalent to that of a current type inverter having an input state of the zero current vector ISS. A power conversion circuit 3*a* has a circuit structure equivalent to that of a current type inverter having an input state of the zero current vector ITT. In other words, an operation of selecting any one of the power conversion circuits 1*a*, 2*a* and 3*a* and deciding ON-/OFF-states of switches of the selected circuit 1*a*, 2*a* or 3*a* on the basis of an output current vector is equal to an operation of selecting a state of inputting any one of three zero current vectors and outputting the output current vector employed for deciding the ON-/OFF-states of the switches in the current type inverter 300.

Figure 9:
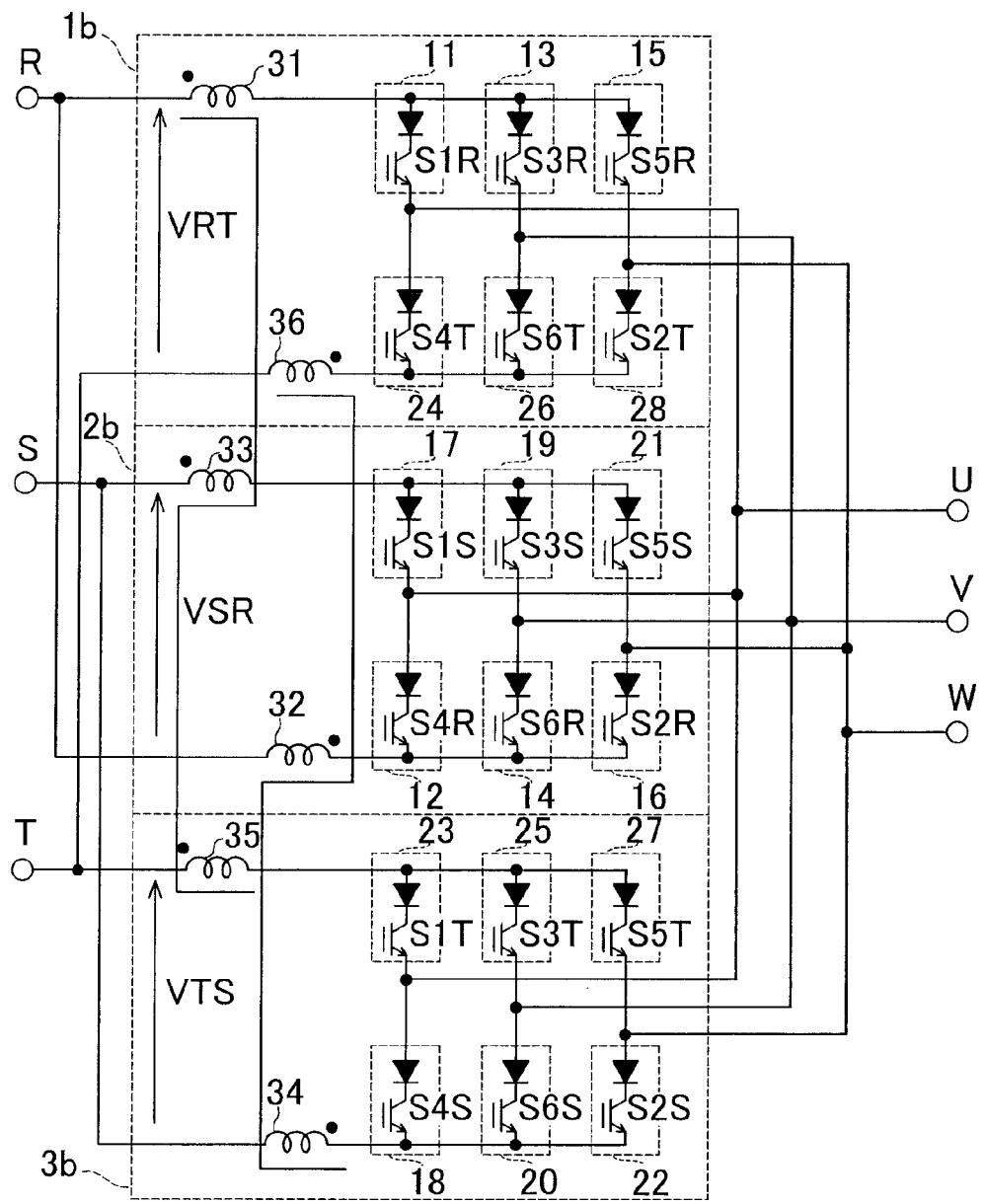
FIG. 9 is a circuit diagram in a case of generating nonzero current vectors (IRT, ISR and ITS) in the power converter according to the first embodiment of the present invention.

FIG. 9, illustrating a structure electrically identical to that shown in FIG. 8, changes virtual arrangements of the one-way switches 11 to 28 shown in FIG. 8, in order to simplify illustration of current vectors. As shown in FIG. 9, a power conversion circuit 1*b* has a circuit structure equivalent to that of a current type inverter having an input state of the current vector IRT in which the one-way switches 311 (S4*c*) and 316 (S5*c*) of the current type inverter 300 shown in FIG. 5 are in ON-states and the one-way switches 312 (S6*c*) 313 (S2*c*), 314 (S1*c*) and 315 (S3*c*) are in OFF-states. Similarly, a power conversion circuit 2*b* has a circuit structure equivalent to that of a current type inverter having an input state of the current vector ISR. A power conversion circuit 3*b* has a circuit structure equivalent to that of a current type inverter having an input state of the current vector ITS. In other words, an operation of selecting any one of the power conversion circuits 1*b*, 2*b* and 3*b* and deciding ON-/OFF-states of switches of the selected circuit 1*b*, 2*b* or 3*b* on the basis of an output current vector is equal to an operation of selecting a state of inputting any one of the nonzero current vectors IRT, ISR and ITS and outputting the output current vector employed for deciding the ON-/OFF-states of the switches in the current type inverter 300.

Figure 10:
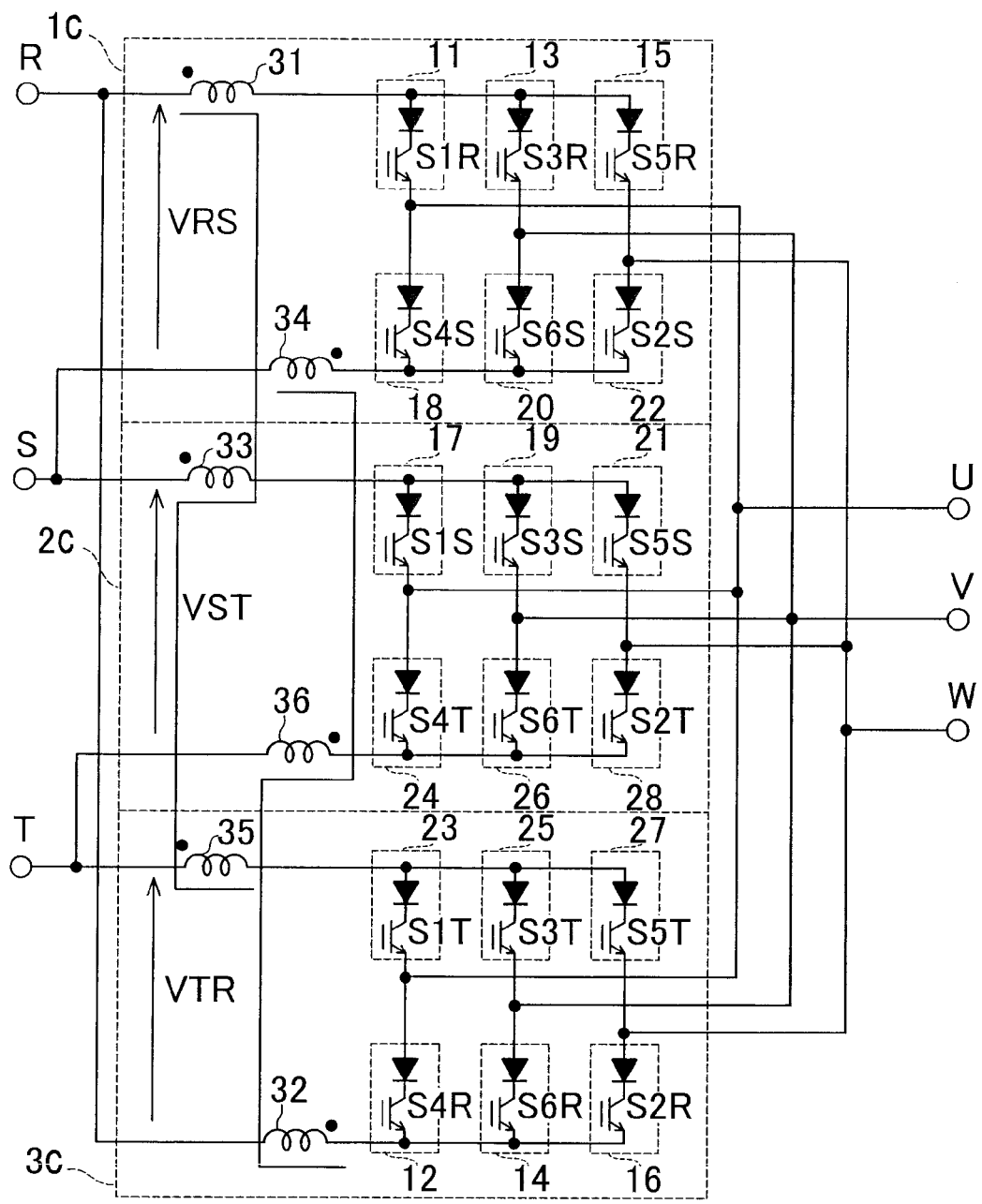
FIG. 10 a circuit diagram in a case of generating other nonzero current vectors (IRS, IST and ITR) in the power converter according to the first embodiment of the present invention.

FIG. 10, illustrating a structure electrically identical to that shown in FIG. 8, changes virtual arrangements of the one-way switches 11 to 28 shown in FIG. 8, in order to simplify illustration of current vectors. As shown in FIG. 10, a power conversion circuit 1*c* has a circuit structure equivalent to that of a current type inverter having an input state of the current vector IRS. Similarly, a power conversion circuit 2*c* has a circuit structure equivalent to that of a current type inverter having an input state of the current vector IST. A power conversion circuit 3*c* has a circuit structure equivalent to that of a current type inverter having an input state of the current vector ITR. In other words, an operation of selecting any one of the power conversion circuits 1*c*, 2*c* and 3*c* and deciding ON-/OFF-states of switches of the selected circuit 1*c*, 2*c* or 3*c* on the basis of an output current vector is equal to an operation of selecting a state of inputting any one of the nonzero current vectors IRS, IST and ITR and outputting the output current vector employed for deciding the ON-/OFF-states of the switches in the current type inverter 300.

The direct current inductors 31, 33 and 35 shown in FIGS. 8 to 10 are coupled with each other, while the direct current inductors 32, 34 and 36 are also coupled with each other. Thus, the driving signal distribution circuit 53 can instantaneously switch direct currents flowing in the direct current inductors 31, 33 and 35 between the direct current inductors 31, 33 and 35 (equivalently to a flyback converter) by turning on/off the one-way switches 11 to 28. The driving signal distribution circuit 53 can also instantaneously switch direct currents flowing in the direct current inductors 32, 34 and 36 between the direct current inductors 32, 34 and 36 by turning on/off the one-way switches 11 to 28. Therefore, it is possible to arbitrary select any of the nine power conversion circuits shown in FIGS. 8 to 10 and to feed currents to the selected power conversion circuit. The converter PWM calculation portion 522 outputs information as to which ones the selected two nonzero current vectors and the selected one zero current vector are respectively to the driving signal distribution circuit 53. The driving signal distribution circuit 53 selects any power conversion circuit according to this information. The driving signal distribution circuit 53 so selects the power conversion circuit that it selects any one of the three structures of the power converters shown in FIGS. 8 to 10. On the other hand, the inverter PWM calculation portion 521 outputs information as to which ones the selected two nonzero current vectors and the selected one zero current vector are respectively to the driving signal distribution circuit 53. The driving signal distribution circuit 53 decides ON-/OFF-states of switches of the selected power conversion circuit according to this information and turns off all switches of the unselected two power conversion circuits in the selected structure of the power converter, thereby deciding ON-/OFF-states of all switch driving signals S1R to S6R, S1S to S6S and S1T to S6T. The driving signal distribution circuit 53 further outputs the switch driving signals S1R to S6R, S1S to S6S and S1T to S6T according to the durations $T_z$, $T_i$ and $T_{i+1}$ output from the inverter PWM calculation portion 521 and the converter PWM calculation portion 522.

Figure 11:
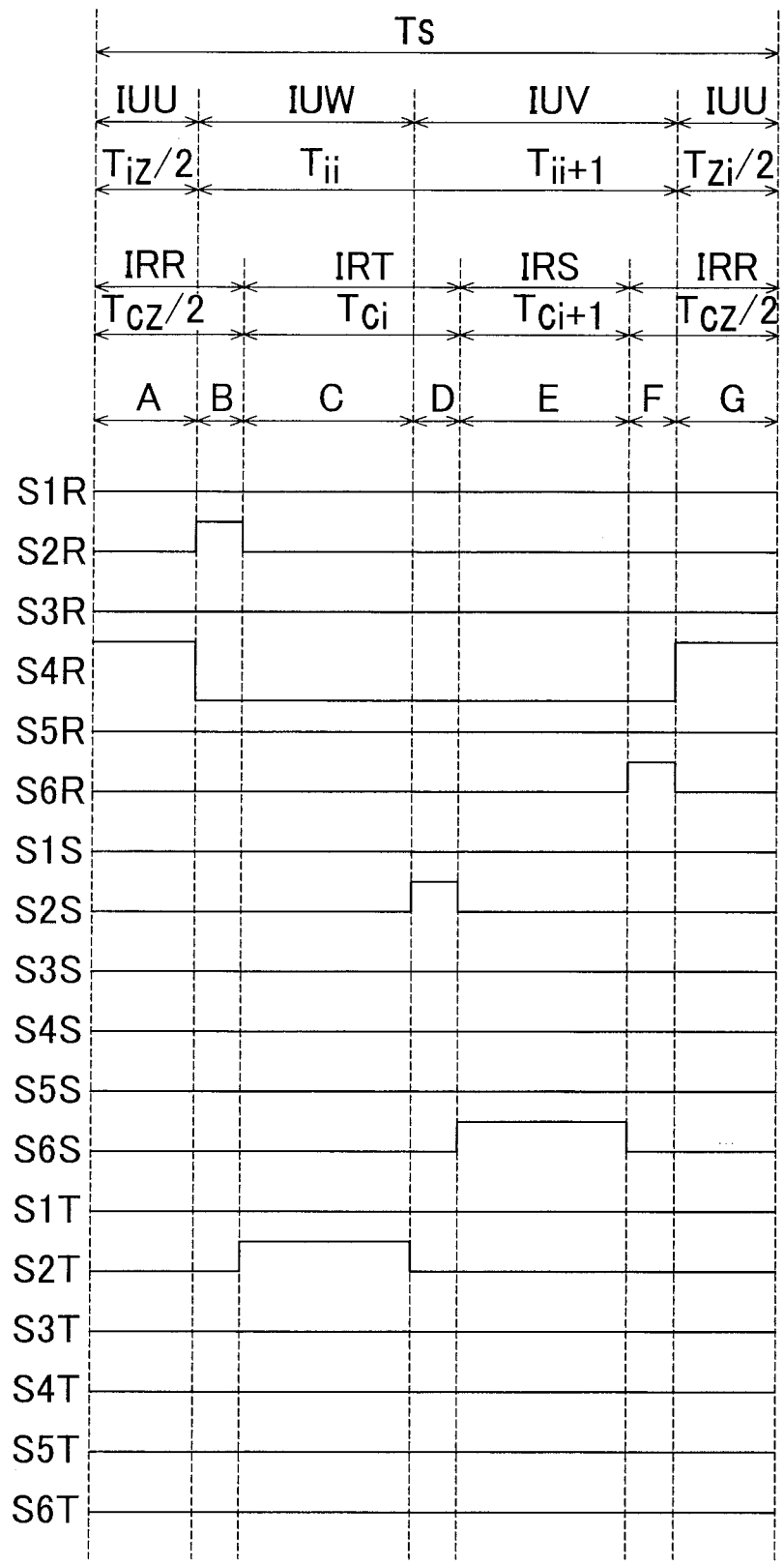
FIG. 11 is a timing chart of switch driving signals in the power converter according to the first embodiment of the present invention.

FIG. 11 shows a timing chart of the switch driving signals S1R to S6R, S1S to S6S and S1T to S6T with respect to the power converter 100 in which the output current command vector Io_ref and the input current command vector Ii_ref are on the positions shown in FIGS. 6 and 7, for example. In the states shown in FIGS. 6 and 7, two nonzero current vectors adjacent to the output current command vector Io_ref are IUW and IUV, and two nonzero current vectors adjacent to the input current command vector Ii_ref are IRT and IRS. Referring to FIG. 11, it is assumed that the zero current vectors are IUU and IRR for the output current command vector Io_ref and the input current command vector Ii_ref respectively, whose phases are commonly included in the two adjacent nonzero current vectors. Thus, the frequency for switching the one-way switches can be reduced, while employment of other zero current vectors for another object is irrelevant to the present invention.

The operation of the control circuit 51 is more detailedly described with reference to FIG. 11. The inverter PWM calculation portion 521 sets the durations of the zero current vector IUU and nonzero current vectors IUW and IUV to $T_{iz}$, $T_{ii}$ and $T_{ii+1}$ respectively. The converter PWM calculation portion 522 sets the durations of the zero current vector IRR and nonzero current vectors IRT and IRS to $T_{cz}$, and $T_{ci+1}$ respectively. Referring to FIG. 11, the driving signal distribution circuit 53 halves the time for outputting the zero currents, and provides two half times for outputting the zero currents one by one at the beginning and end of a carrier cycle Ts. The driving signal distribution circuit 53 sets the beginning of the carrier cycle Ts to a time zero, obtains times $T_{iz}/2$, $T_{iz}/2+T_{ii}$ and $T_{iz}/2+T_{ii}+(T_{ii+1})$ from the durations operated by the inverter PWM calculation portion 521 while obtaining $T_{cz}/2$, $T_{cz}/2+T_{ci}$ and $T_{cz}/2+T_{ci}+(T_{ci+1})$ from the durations operated by the converter PWM calculation portion 522, and lines up these six times in descending order, thereby dividing the carrier cycle Ts into sections A to G.

The driving signal distribution circuit 53 decides combinations of the power conversion circuits shown in FIGS. 8 to 10 and outputs current vectors as to the sections A to G as follows:

Section A: (power conversion circuit 1a and IUU)
Section B: (power conversion circuit 1a and IUW)
Section C: (power conversion circuit 1b and IUW)
Section D: (power conversion circuit 1b and IUV)
Section E: (power conversion circuit 1c and IUV)
Section F: (power conversion circuit 1a and IUV)
Section G: (power conversion circuit 1a and IUU)

Further, the driving signal distribution circuit 53 selects one-way switches to be turned on for outputting specified current vectors from the combinations of the power conversion circuits and the output current vectors in the sections A to G with reference to actual current type inverter circuits. Referring to FIG. 11, the one-way switches are as follows:

Section A: (S1R and S4R)
Section B: (S1R and S2R)
Section C: (S1R and S2T)
Section D: (S1R and S2S)
Section E: (S1R and S6S)
Section F: (S1R and S6R)
Section G: (S1R and S4R)

The driving signal distribution circuit 53 outputs the switch driving signals in the timing chart shown in FIG. 11 by turning on the one-way switches decided in the aforementioned manner while turning off the remaining one-way switches in the respective sections A, B, C, D, E, F and G. When pairs of one-way switches to be turned on are previously tabled as to all 81 combinations of current vectors related to nine inputs and nine outputs on the basis of the circuit diagrams shown in FIGS. 8 to 10, the driving signal distribution circuit 53 can immediately decide the pairs of one-way switches to be turned on with reference to the table, without referring to the circuit diagrams.

Thus, the power converter 100 according to the first embodiment is a power converter driven by switch driving signals generated from current command vectors, similarly to the three-phase input three-phase output current type inverter 300.

According to the first embodiment, as hereinabove described, the direct current inductors 31, 33 and 35 (32, 34 and 36) provided on the plurality of power conversion circuits 1 to 3 respectively are coupled with each other, so that currents move between the windings of the coupled direct current inductors 31, 33 and 35 (32, 34 and 36) on the basis of ON-/OFF-states of the plurality of one-way switches 11 to 18. Thus, the number of one-way switches passing currents therethrough is reduced and conduction loss can be reduced as compared with the current type inverter 300 shown in FIG. 5.

According to the first embodiment, as hereinabove described, the power converter 100 is based on the same operation principle as the current type inverter 300 shown in FIG. 5, whereby the power converter 100 can bidirectionally perform power conversion and can increase/reduce voltages.

According to the first embodiment, as hereinabove above described, the second electrodes of the filter capacitors 4, 5 and 6 are connected with each other while the second electrodes of the filter capacitors 7, 8 and 9 are also connected with each other, whereby the power converter 100 can be inhibited from size increase dissimilarly to a conventional matrix converter provided with switches for connecting or disconnecting filter capacitors 4 to 9 with or from each other.

Second Embodiment

A power converter 101 according to a second embodiment of the present invention is now described with reference to FIG. 12. The power converter 101 according to the second embodiment receives single-phase alternating currents (two-phase alternating currents) or direct currents and outputs three-phase alternating currents, dissimilarly to the power converter 100 according to the aforementioned first embodiment receiving three-phase alternating currents and outputting three-phase alternating currents.

The power converter 101 according to the second embodiment has a structure obtained by removing the T terminal and the power conversion circuit 3 from the power converter 100 according to the first embodiment shown in FIG. 1. In other words, the power converter 101 according to the second embodiment has an R terminal and an S terminal which are input terminals of a two-phase AC source, a U terminal, a V terminal and a W terminal which are three-phase alternating current output terminals, two power conversion circuits 1 and 2, a filter capacitor 4, filter capacitors 7, 8 and 9 and a control circuit 54, as shown in FIG. 12. The remaining structure of the power converter 101 according to the second embodiment is similar to that of the power converter 100 according to the aforementioned first embodiment.

The operation principle of the power converter 101 according to the second embodiment is now described with reference to FIGS. 12 to 14.

Figure 13:
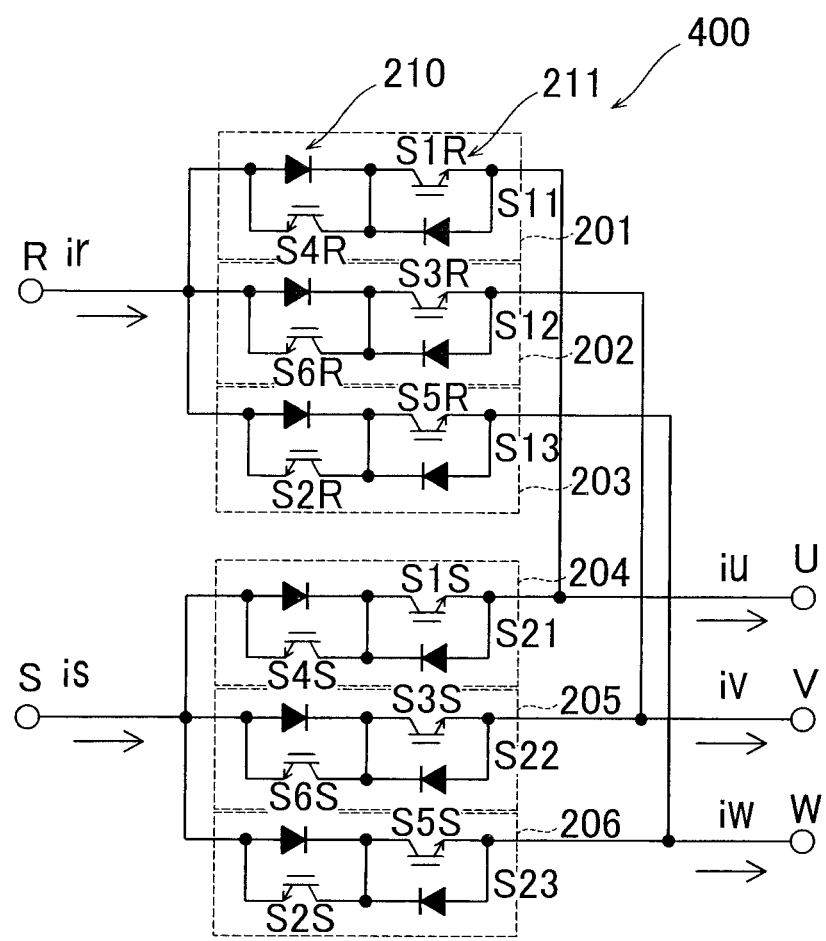
FIG. 13 is a circuit diagram of a two-way switch group of another current type power converter.

A two-way switch group 400 shown in FIG. 13, partially constructing a current type power converter according to a matrix converter and performing power conversion, has a structure obtained by removing the T terminal and the two-way switches 207 to 209 connected thereto from the two-way switch group 200 shown in FIG. 3. In other words, the two-way switch group 400 is provided with an R terminal and an S terminal which are input terminals of a two-phase AC source and a U terminal, a V terminal and a W terminal which are three-phase alternating current output terminals, as shown in FIG. 13. Six two-way switches 201 to 206 are provided between the R and S terminals and the U, V and W terminals. The remaining structure of the two-way switch group 400 is similar to that of the two-way switch group 200. While the R and T terminals and the U, V and W terminals are provided with reactors and capacitors capable of being disconnected from each other by switches respectively, FIG. 13 omits the reactors and the capacitors.

The two-way switches 201 to 206 are driven by switch driving signals S11, S12, S13, S21, S22 and S23 respectively.

Input and output currents in and from the two-way switch group 400 become alternating currents having substantially constant amplitudes, due to actions of the aforementioned unshown reactors connected to the input terminals and the output terminals. The following formula (15) expresses the relation between the single-phase currents (two-phase currents) (ir and is) and the three-phase currents (iu, iv and iw) input in and output from the two-way switches 201 to 206 respectively. Then:

$$\begin{bmatrix} iu \\ iv \\ iw \end{bmatrix} = \begin{bmatrix} S11 & S21 \\ S12 & S22 \\ S13 & S23 \end{bmatrix} \cdot \begin{bmatrix} ir \\ is \end{bmatrix} \qquad (15)$$

The switch driving signals S11, S12, S13, S21, S22 and S23 serve as ON signals when they are "1", and serve as OFF signals when they are "0". It is assumed that the direction from the input terminals (R and S terminals) toward the output terminals (U, V and W terminals) is positive.

Figure 14:
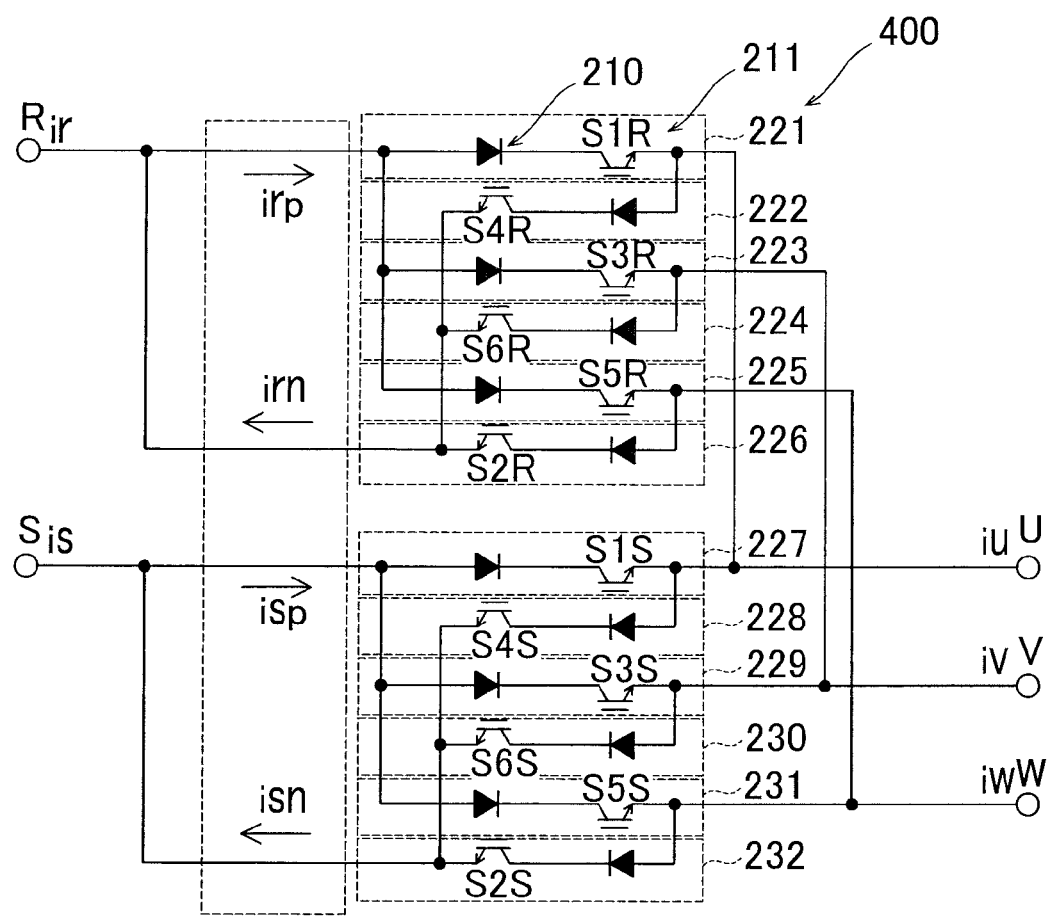
FIG. 14 is a circuit diagram of a power converter electrically equivalent to the power converter shown in FIG. 13.

FIG. 14 shows a circuit electrically equal to that shown in FIG. 13. FIG. 14 shows one-way switches 221 to 232 included in the two-way switches 201 to 206 in a separated manner. The following formulas (16) and (17) express the relation between the two-phase currents (ir and is) and the three-phase currents (iu, iv and iw) input in and output from the one-way switches 221 to 232 respectively:

$$\begin{bmatrix} iu \\ iv \\ iw \end{bmatrix} = \begin{bmatrix} S1R & S1S \\ S3R & S3S \\ S5R & S4S \end{bmatrix} \cdot \begin{bmatrix} irp \\ isp \end{bmatrix} + \begin{bmatrix} S4R & S4S \\ S6R & S6S \\ S2R & S2S \end{bmatrix} \cdot \begin{bmatrix} irn \\ isn \end{bmatrix} \qquad (16)$$

$$\begin{bmatrix} ir \\ is \end{bmatrix} = \begin{bmatrix} irp \\ isp \end{bmatrix} + \begin{bmatrix} irn \\ isn \end{bmatrix} \qquad (17)$$

Switch driving signals S1R to S6R and S1S to S6S serve as ON signals when they are "1", and serve as OFF signals when they are "0". Currents irp and isp are direct currents unidirectionally flowing from the input terminals (R and S terminals) toward the output terminals (U, V and W terminals). Currents irn and isn are direct currents unidirectionally flowing from the output terminals toward the input terminals. In the current type power converter, input currents are sine waves, and the currents irp and isp are direct currents having half-wave rectification waveforms (positive portions of the sine waves) obtained by positively rectifying the input currents ir and is respectively, while the currents irn and isn are direct currents having half-wave rectification waveforms (negative portions of the sine waves) obtained by negatively rectifying the input currents ir and is respectively.

Figure 12:
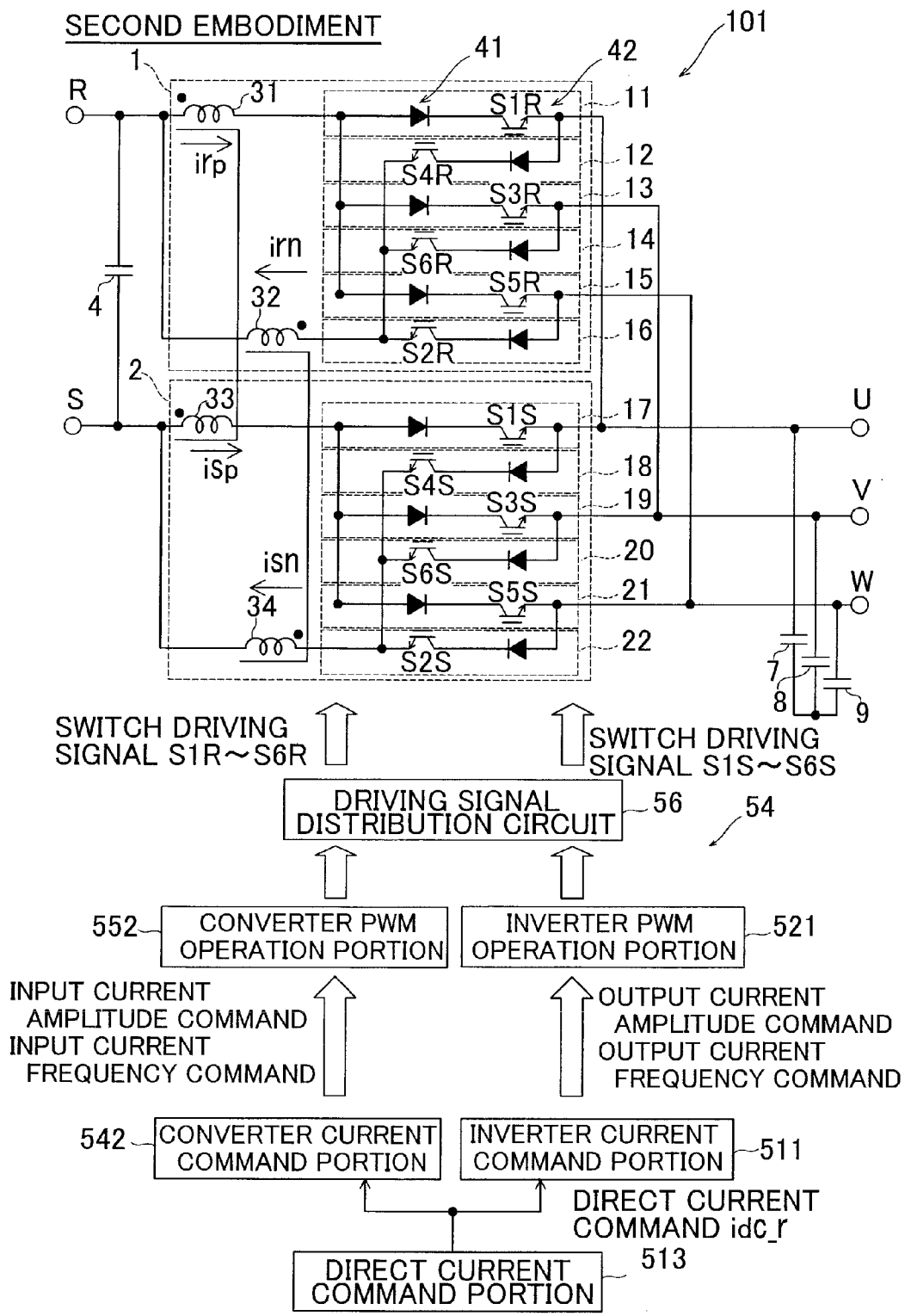
FIG. 12 is a circuit diagram of a power converter according to a second embodiment of the present invention.

Comparing FIGS. 12 and 14 with each other, it is understood that the power converter 101 according to the second embodiment is obtained by providing coupled inductors 31 to 34 on passages of the direct currents irp to isn in the two-way switch group 400 constituting the current type power converter shown in FIG. 14. A current can be moved between closed circuits connected to windings of coupled inductors as described above, and hence the current type power converter 101 can instantaneously switch states shown in the following formula (18). This means that the power converter 101 regularly feeds a pulsating direct current idc to either one of direct current inductors 31 and 33 and regularly feeds another pulsating direct current −idc to either one of direct current inductors 32 and 34. The power converter 101 implements this by regularly setting any one of S1R, S3R, S5R, S1S, S3S and S5S to "1" and regularly setting any one of S2R, S4R, S6R, S2S, S4S and S6S to "1".

$$\begin{bmatrix} irp \\ isp \end{bmatrix} = \begin{bmatrix} idc \\ 0 \end{bmatrix}, \begin{bmatrix} irp \\ isp \end{bmatrix} = \begin{bmatrix} 0 \\ idc \end{bmatrix}, \qquad (18)$$

$$\begin{bmatrix} irn \\ isn \end{bmatrix} = \begin{bmatrix} -idc \\ 0 \end{bmatrix}, \begin{bmatrix} irn \\ isn \end{bmatrix} = \begin{bmatrix} 0 \\ -idc \end{bmatrix}$$

The power converter 101 can render the average of the input current it (is) sinusoidal by applying pulse width modulation (PWM) to the states of the above formula (18) thereby varying the time for feeding idc to each winding. In other words, the power converter 101 according to the second embodiment can operate equivalently to the current type power converter by pulsing direct currents flowing in the current type power converter and feeding currents equivalent to those in the current converter by application of PWM.

An operation of the control circuit 54 generating switch driving signals S1R to S6R and S1S to S6S by employing input and output current command vectors with respect to the power converter 101 according to the second embodiment is now described with reference to FIGS. 15 to 18.

Figure 15:
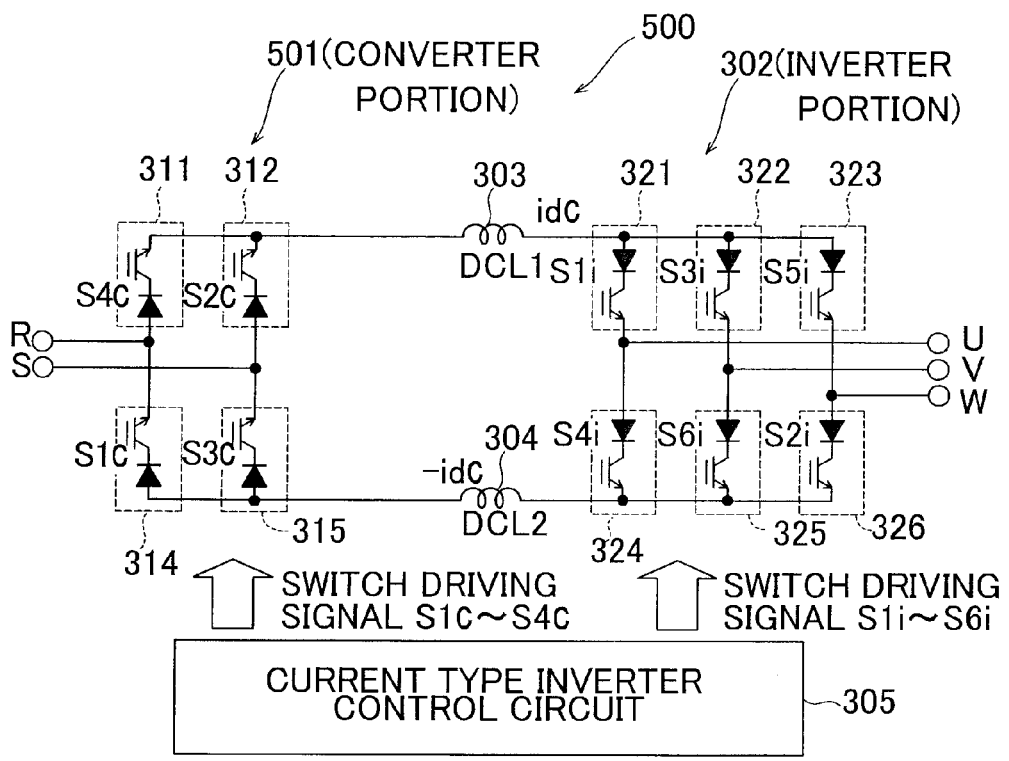
FIG. 15 is a circuit diagram of a two-phase input three-phase output current type inverter.
Figure 16:
FIG. 16 is a spatial vector diagram of an input side of the power converter according to the second embodiment.

A current type inverter 500 shown in FIG. 15 has a structure obtained by removing the T terminal and the one-way switches 313 and 316 connected thereto from the current type inverter 300 shown in FIG. 5.

In the two-phase input three-phase output current type inverter 500, a converter portion 501 performing AC-DC conversion generates the direct current idc from an AC source, and an inverter portion 302 performing DC-AC conversion thereafter converts the direct current idc to an alternating current, as shown in FIG. 15. In this case, the converter portion 501 is controlled to render the direct current idc constant, and the inverter portion 302 is controlled to output an intended current. The inverter portion 302 can output current vectors according to Table 1, similarly to the first embodiment. On the other hand, the converter portion 501 can receive current vectors according to Table 3.

TABLE 3

|  | S1C | S2C | S3C | S4C |
|---|---|---|---|---|
| IRS | OFF | OFF | ON | ON |
| ISR | ON | ON | OFF | OFF |

As shown in FIG. 12, the control circuit 54 includes a direct current command portion 513, an inverter current command portion 511, an inverter PWM calculation portion 521, a converter current command portion 542 and a converter PWM calculation portion 552. Similarly to the first embodiment, the direct current command portion 513 generates a direct current command idc_r, while the inverter current command portion 511 and the inverter PWM calculation portion 521 generate switch driving signals S1i, S3i, S5i, S4i, S6i and S2i for the inverter portion 302 on the basis of the direct current command idc_r. The converter current command portion 542 and the converter PWM calculation portion 552 generate switch driving signals S4c, S2c, S1c and S3c for the converter portion 501 shown in FIG. 15 on the basis of the direct current command idc_r. The control circuit 54 further includes a driving signal distribution circuit 56, and generates switch driving signals S1R to S6R and S1S to S6S of the current type power converter 101 according to the second embodiment from these switch driving signals.

The converter portion 501 performing AC-DC conversion shown in FIG. 15 is formed to be capable of outputting two zero current vectors (IRR and ISS) and two current vectors (ISR and IRS) having the length of idc. The converter current command portion 542 generates an input current amplitude command equal to the direct current command idc_r and an input current frequency command equal to the frequency of a power source connected to an input, for example. The converter PWM calculation portion 552 is formed to receive the input current amplitude command and the input current frequency command from the converter current command portion 542, to generate an input current command vector, and to operate the time of a current vector input in the current type inverter 500. The input current vector is a vector reciprocating on a line IRS-ISR in a vector diagram shown in FIG. 16 in a cycle decided by the input current frequency command. The converter PWM calculation portion 552 integrates the input current frequency command and sets a current phase command θIin. The converter PWM calculation portion 552 sets the amplitude and the phase in this manner, whereby the magnitude of the input current command vector Ii_ref is set according to the following formula (19), for example:

$$|Ii\_ref| = idc \times |\cos \theta Iin| \quad (19)$$

The above is an example in a case where a phase at which the magnitude of the input current command vector Ii_ref is maximized is regarded as a reference phase. The converter PWM calculation portion 552 regards the ratio between the magnitude of the input current vector Ii_ref set according to the formula (19) and a value √3/2 times the direct current command idc_r as a converter modulation factor Iin_r. Further, the converter PWM calculation portion 552 decides an output time Tz of a zero current vector and an output time $T_i$ of a nonzero current vector $I_i$ according to the following formulas (20) and (21) by employing one zero current vector (IRR or ISS) and one nonzero current vector $I_i$ (IRS or ISR):

$$T_i = Ts \cdot Iout\_r \quad (20)$$

$$Tz = Ts - T_i \quad (21)$$

Thus, the inverter PWM calculation portion 521 and the converter PWM calculation portion 552 decide current command vectors for the outputs and the inputs of the two-phase input three-phase output current type inverter 500 respectively, select three adjacent current vectors (IUU, IUW and IUV, for example: see FIG. 6) with respect to the output current command vector Io_ref and select two adjacent current vectors (IRR and IRS, for example: see FIG. 16) with respect to the input current command vector Ii_ref in a PWM cycle. Further, the inverter PWM calculation portion 521 and the converter PWM calculation portion 552 set durations of the states of these five current vectors respectively according to the above formulas (5), (7), (20) and (21).

The operation of the control circuit 54 of the power converter 101 generating the switch driving signals S1R to S6R and S1S to S6S is now described with reference to FIGS. 12 and 15.

The following formula (22) expresses the relation between the two-phase currents (ir and is) and the direct currents (idc and −idc) input in and output from one-way switches 311, 312, 314 and 315 of the converter portion 501 shown in FIG. 15 through switch driving signals S1c to S4c:

$$\begin{bmatrix} idc \\ -idc \end{bmatrix} = \begin{bmatrix} S4c & S2c \\ S1c & S3c \end{bmatrix} \cdot \begin{bmatrix} ir \\ is \end{bmatrix} \quad (22)$$

The switch driving signals S1c to S4c serve as ON signals when they are "1", and serve as OFF signals when they are "0". The following formula (23) expresses the relation between the direct currents (idc and −idc) and three-phase currents (iu, iv and iw) input in and output from one-way switches 321 to 216 of the inverter portion 302 shown in FIG. 15 through switch driving signals S11 to S6i:

$$\begin{bmatrix} iu \\ iv \\ iw \end{bmatrix} = \begin{bmatrix} S1i & S4i \\ S3i & S6i \\ S5i & S2i \end{bmatrix} \cdot \begin{bmatrix} idc \\ -idc \end{bmatrix} \quad (23)$$

The switch driving signals S11 to S6i serve as ON signals when they are "1", and serve as OFF signals when they are "0".

In the power converter 101 according to the second embodiment, the direct current idc flows to either one of the direct current inductors 31 and 33 and the direct current −idc flows to either one of the direct current inductors 32 and 34 as described above, and hence the following formula (24) expresses the relation between the two-phase currents (ir and is) input in the power converter 101 and the direct currents (idc and −idc), similarly to the above formula (22):

$$\begin{bmatrix} idc \\ -idc \end{bmatrix} = \begin{bmatrix} S1R+S3R+S5R & S1S+S3S+S5S \\ S4R+S6R+S2R & S4S+S6S+S2S \end{bmatrix} \cdot \begin{bmatrix} ir \\ is \end{bmatrix} \quad (24)$$

Any one of S1R, S3R, S5R, S1S, S3S and S5S is regularly "1" and any one of S2R, S4R, S6R, S2S, S4S and S6S is regularly "1" as described above, and hence the following formula (25) expresses the relation between the direct currents (idc and −idc) and the three-phase currents (iu, iv and i) output from the power converter 101, similarly to the above formula (23):

$$\begin{bmatrix} iu \\ iv \\ iw \end{bmatrix} = \begin{bmatrix} S1R+S1S & S4R+S4S \\ S3R+S3S & S6R+S6S \\ S5R+S5S & S2R+S2S \end{bmatrix} \cdot \begin{bmatrix} idc \\ -idc \end{bmatrix} \quad (25)$$

Considering that the power converter 101 according to the second embodiment converts received single-phase AC power to three-phase AC power different in voltage and frequency and outputs the converted three-phase AC power similarly to the two-phase input three-phase output current type inverter 500, it follows that the relation of the following formula (26) must be satisfied from comparison of the above formulas (22) and (24):

$$S4c=S1R+S3R+S5R, S2c=S1S+S3S+S5S,$$

$$S1c=S4R+S6R+S2R, S3c=S4S+S6S+S2S \quad (26)$$

Similarly, the relation of the following formula (27) must be satisfied from comparison of the above formulas (23) and (25):

$$S1i=S1R+S1S, S4i=S4R+S4S,$$

$$S3i=S3R+S3S, S6i=S6R+S6S,$$

$$S5i=S5R+S5S, S2i=S2R+S2S \quad (27)$$

Comparing the above formulas (26) and (27) with each other, it is understood that there is the relation of the following formula (28):

$$S1R=S4c \cdot S1i \; S3R=S4c \cdot S3i, S5R=S4c \cdot S5i,$$

$$S4R=S1c \cdot S4i, S6R=S1c \cdot S6i, S2R=S1c \cdot S2i,$$

$$S1S=S2c \cdot S1i, S3S=S2c \cdot S3i \; S5S=S2c \cdot S5i,$$

$$S4S=S2c \cdot S4i, S6S=S3c \cdot S6i \; S2S=S3c \cdot S2i \quad (28)$$

In other words, the inverter PWM calculation portion 521 of the power converter 101 according to the second embodiment generates Sit to Si6 of the formula (23) on the basis of one zero current vector and two nonzero current vectors and times Tz, $T_i$ and $T_{i+1}$ while using Table 1, and outputs them to the driving signal distribution circuit 56, similarly to the power converter 100 according to the first embodiment. The converter PWM calculation portion 552 generates Sc1 to Sc4 of the formula (22) (while using Table 3) and outputs them to the driving signal distribution circuit 56, similarly to the inverter PWM calculation portion 521. The driving signal distribution circuit 56 of the control circuit 54 shown in FIG. 12 generates the switch driving signals S1R to S6R and S1S to S6S of the current type power converter 101 through a logical product circuit on the basis of the above formula (28). Consequently, the control circuit 54 drives the power converter 101 on the basis of the switch driving signals of the two-phase input three-phase output current type inverter 500.

Another structure of the driving signal distribution circuit 56 of the control circuit 54 generating the switch driving signals S1R to S6R and S1S to S6S is now described with reference to FIGS. 17 and 18.

Figure 17:
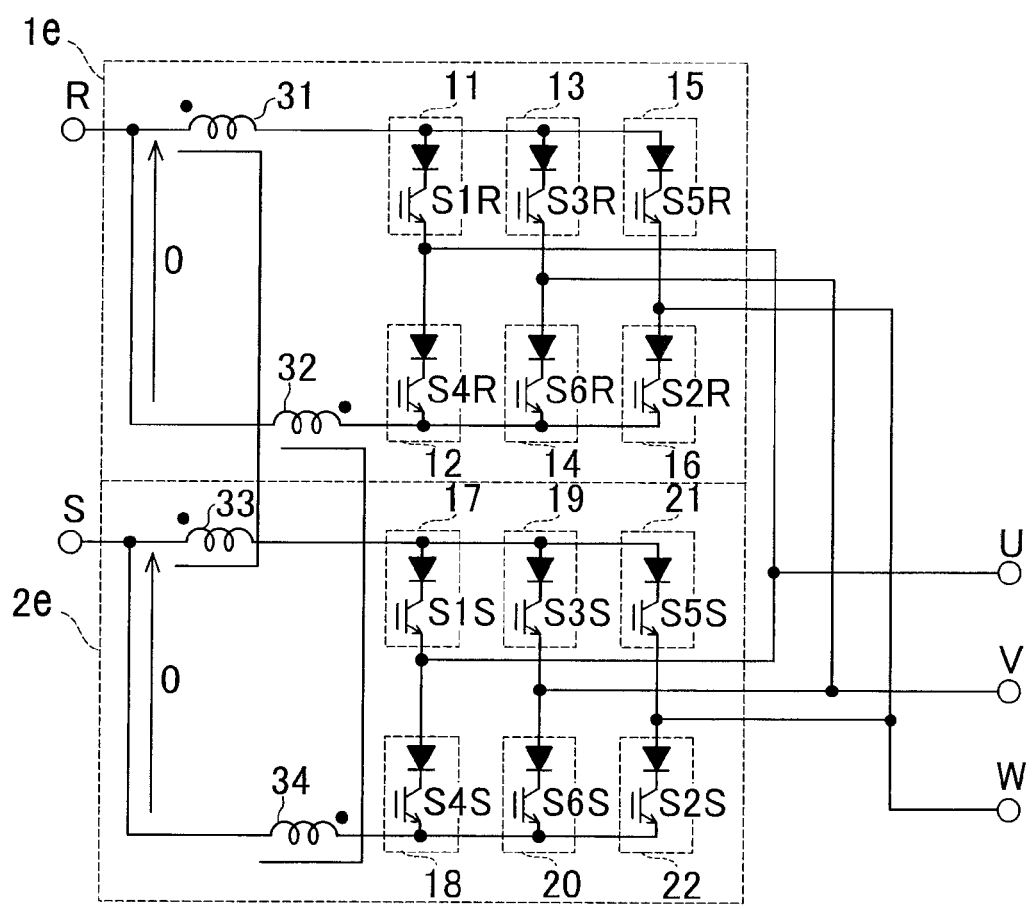
FIG. 17 is a circuit diagram in a case of generating zero current vectors (IRR and ISS) in the power converter according to the second embodiment.

FIG. 17, illustrating a structure electrically identical to that shown in FIG. 12, changes virtual arrangements of the one-way switches 11 to 22 shown in FIG. 12, in order to simplify illustration of zero current vectors. Further, FIG. 17 omits illustration of the filter capacitors 4 and 7 to 9 and the control circuit 51. As shown in FIG. 17, a power conversion circuit 1e has a circuit structure equivalent to that of a current type inverter having an input state of the zero current vector IRR in which the one-way switches 314 (S1c) and 311 (S4c) of the current type inverter 500 shown in FIG. 15 are in ON-states and the one-way switches 312 (S2c) and 315 (S3c) are in OFF-states. Similarly, a power conversion circuit 2e has a circuit structure equivalent to that of a current type inverter having an input state of the zero current vector ISS. In other words, an operation of selecting either one of the power conversion circuits 1e and 2e and deciding ON-/OFF-states of switches of the selected circuit 1e or 2e on the basis of an output current vector is equal to an operation of selecting a state of inputting either one of two zero current vectors and outputting the output current vector employed for deciding the ON-/OFF-states of the switches in the current type inverter 500.

Figure 18:
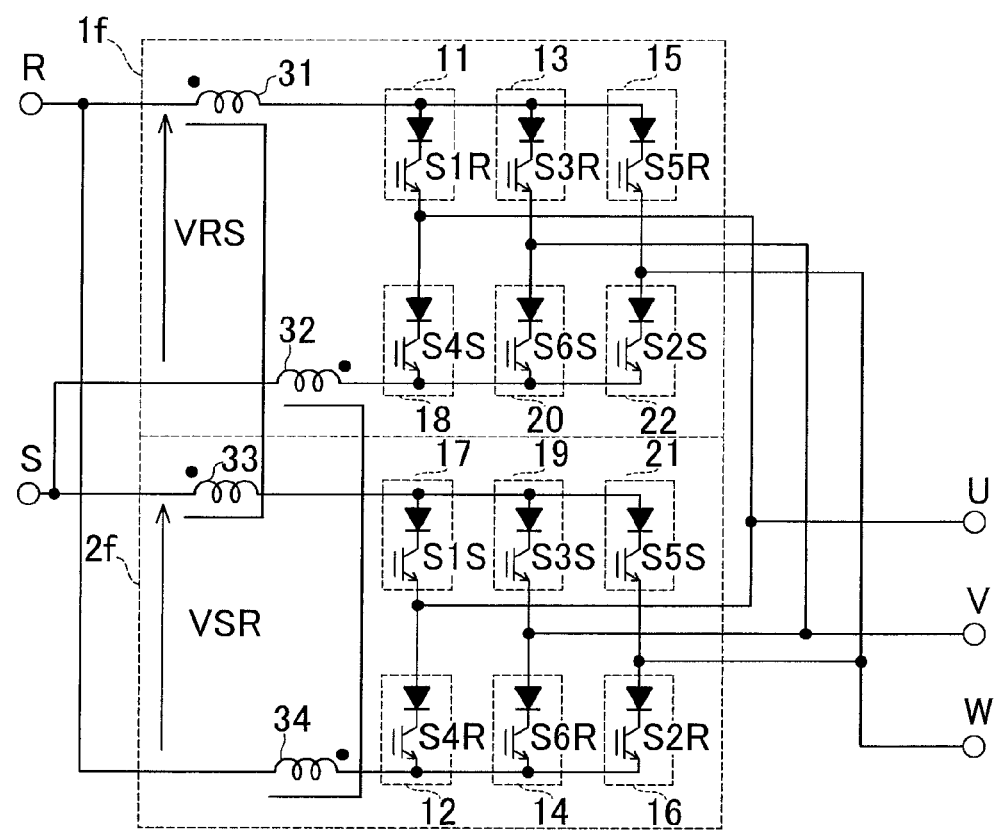
FIG. 18 is a circuit diagram in a case of generating nonzero current vectors (RS and ISR) in the power converter according to the second embodiment.

FIG. 18, illustrating a structure electrically identical to that shown in FIG. 17, changes virtual arrangements of the one-way switches 11 to 22 shown in FIG. 17, in order to simplify illustration of current vectors. As shown in FIG. 18, a power conversion circuit 1f has a circuit structure equivalent to that of a current type inverter having an input state of the current vector IRS in which the one-way switches 314 (S1c) and 312 (S2c) of the current type inverter 500 shown in FIG. 15 are in ON-states and the one-way switches 311 (S4c) an 315 (S3c) are in OFF-states. Similarly, a power conversion circuit 2f has a circuit structure equivalent to that of a current type inverter having an input state of the nonzero current vector ISR. In other words, an operation of selecting either one of the power conversion circuits 1f and 2f and deciding ON-/OFF-states of switches of the selected circuit 1f or 2f on the basis of an output current vector is equal to an operation of selecting a state of inputting either one of the nonzero current vectors IRS and ISR and outputting the output current vector employed for deciding the ON-/OFF-states of the switches in the current type inverter 500.

The direct current inductors 31 and 33 shown in FIGS. 17 and 18 are coupled with each other, while the direct current inductors 32 and 34 are also coupled with each other. Thus, the driving signal distribution circuit 56 can instantaneously switch direct currents flowing in the direct current inductors 31 and 32 between the direct current inductors 31 and 33 (equivalently to a flyback converter) by turning on/off the one-way switches 11 to 22. Similarly, the driving signal distribution circuit 56 can also instantaneously switch direct currents flowing in the direct current inductors 32 and 34 between the direct current inductors 32 and 34 by turning on/off the one-way switches 11 to 22. Therefore, it is possible to arbitrarily select one of the four power conversion circuits shown in FIGS. 17 and 18 and to feed currents to the selected power conversion circuit. The converter PWM calculation portion 552 outputs information as to which ones the selected two nonzero current vectors and the selected zero current vector are respectively to the driving signal distribution circuit 56. The driving signal distribution circuit 56 selects any power conversion circuit according to this information. The driving signal distribution circuit 56 so selects the power conversion circuit that it selects either one of the two structures of the power converter 102 shown in FIGS. 17 and 18. On the other hand, the inverter PWM calculation portion 521 outputs information as to which ones two selected nonzero current vectors and selected one zero current vector are respectively to the driving signal distribution circuit 56. The driving signal distribution circuit 56 decides ON-/OFF-states of switches of the selected power conversion circuit according to this information and turns off all switches of the unselected power conversion circuit in the selected structure of the power converter 102, thereby deciding ON-/OFF-states of all switch driving signals S1R to S6R and S1S to S6S. The driving signal selection circuit 56 further outputs the switch driving signals S1R to S6R and S1S to S6S according to durations Tz, $T_i$ and $T_{i+1}$ output from the inverter PWM calculation portion 521 and the converter PWM calculation portion 552.

Thus, the power converter 101 according to the second embodiment is a power converter driven by switch driving signals generated from current command vectors, similarly to the two-phase input three-phase output current type inverter 500.

The effects of the second embodiment are similar to those of the aforementioned first embodiment.

Third Embodiment

Figure 19:
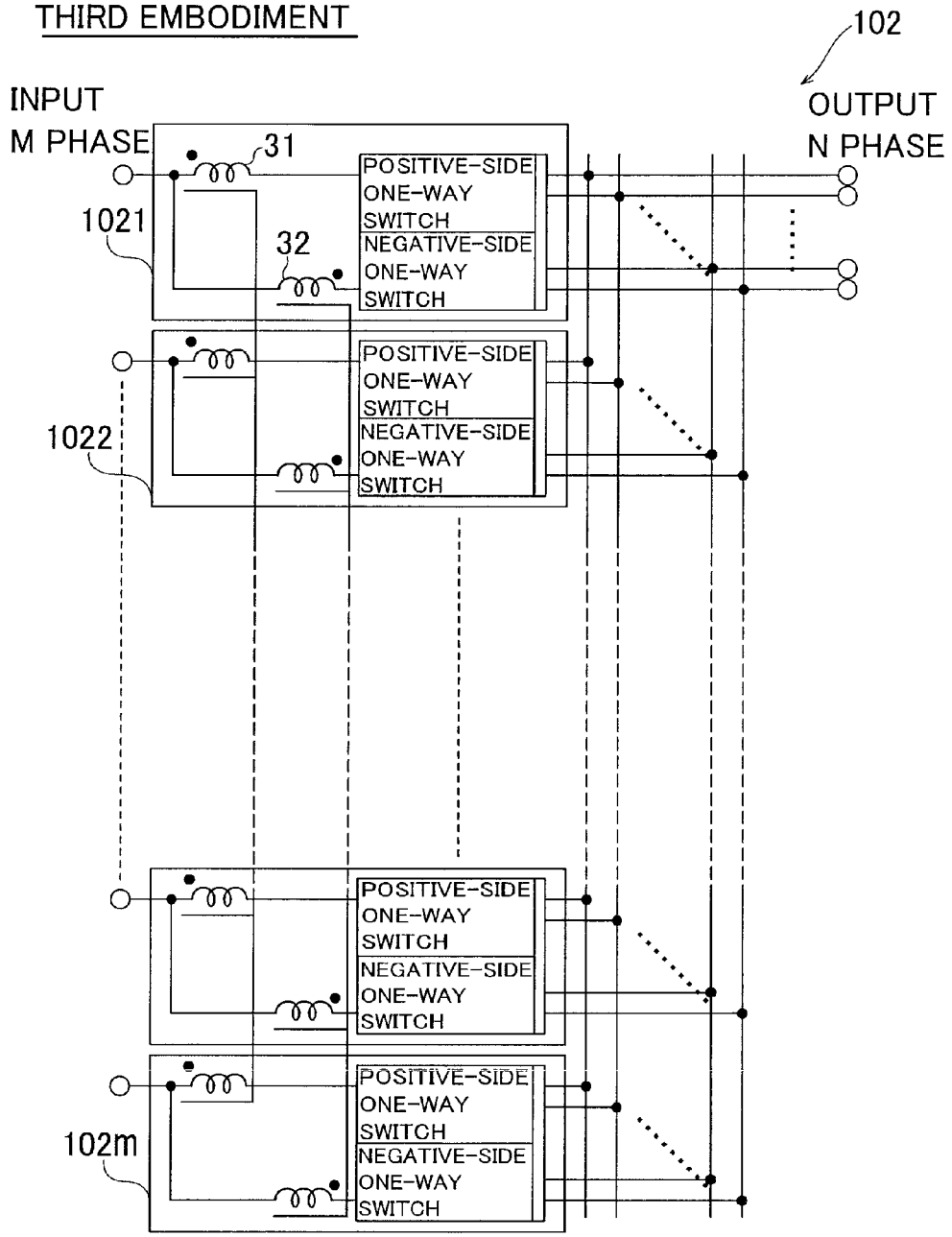
FIG. 19 is a circuit diagram of a power converter according to a third embodiment of the present invention.

A power converter 102 according to a third embodiment of the present invention is now described with reference to FIG. 19. According to the third embodiment, the power converter 102 is an M-phase (M: natural number of at least two) input N-phase (N: natural number of at least two) output power converter, dissimilarly to the three-phase input three-phase output power converter 100 according to the aforementioned first embodiment.

The power converter 102 according to the third embodiment includes M input terminals corresponding to M phases, N output terminals corresponding to N phases and M power conversion circuits 1021, 1022, ..., 102m corresponding to the number of the phases of the inputs. The power converter 102 according to the third embodiment further includes an unshown control circuit 57.

The power conversion circuits 1021, 1022 ..., 102m include N positive-side one-way switches and N negative-side one-way switches. Further, the power conversion circuits 1021, 1022 ..., 102m include windings of M direct current inductors 31 and 32 coupled with each other.

The control circuit 57 is obtained by replacing the inverter PWM calculation portion 521, the converter PWM calculation portion 552 and the driving signal distribution circuit 53 of the control circuit 51 according to the first embodiment shown in FIG. 2 with an unshown inverter PWM calculation portion, an unshown converter PWM calculation portion and an unshown driving signal distribution circuit respectively. A direct current command portion 513, an inverter current command portion 511 and a converter current command portion 512 are absolutely identical to those of the power converter 100 according to the first embodiment, and hence redundant description is omitted.

Figure 20:
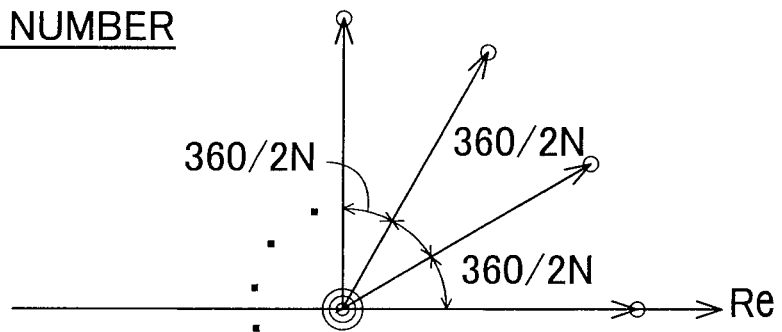
FIG. 20 is a spatial vector diagram of an output side of the power converter according to the third embodiment in a case where N is an odd number.
Figure 21:
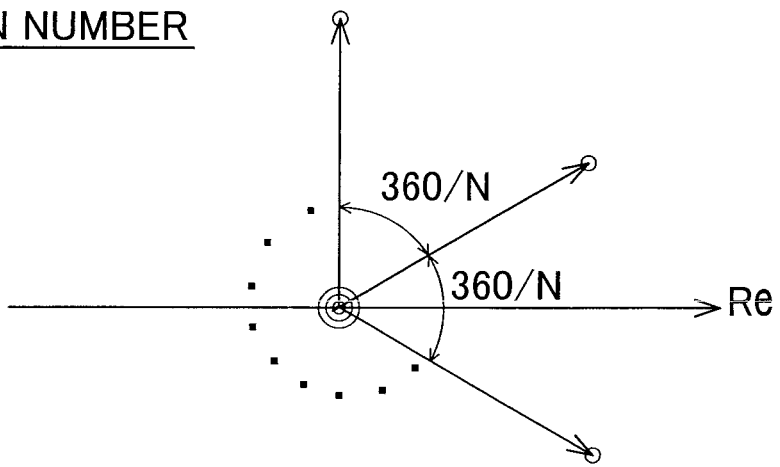
FIG. 21 is a spatial vector diagram of the output side of the power converter according to the third embodiment in a case where N is an even number.

When N indicating the number of phases of the outputs is an odd number, the power converter 102 can generate 2N nonzero current vectors, having equal magnitudes, separated from each other by 360/2N° and N zero current vectors, as shown in FIG. 20. When N is an even number, on the other hand, the power converter 102 can generate N nonzero current vectors, having equal magnitudes, separated from each other by 360/N° and N zero current vectors, as shown in FIG. 21. Also as to inputs, the power converter 102 can receive 2M nonzero current vectors, having equal magnitudes, separated from each other by 360/2M° and M zero current vectors when the number M of the phases is an odd number, and can receive M nonzero current vectors, having equal magnitudes, separated from each other by 360/M° and M zero current vectors when M is an even number.

Also in the power converter 102, the inverter PWM calculation portion selects one zero current vector adjacent to an output current command vector Io_ref and two nonzero current vectors from among the aforementioned 2N (N: odd number) or N (N: even number) nonzero current vectors and N zero current vectors, similarly to the inverter PWM calculation portion 521 of the three-phase input three-phase output power converter 100 according to the aforementioned first embodiment.

Then, the inverter PWM calculation portion of the power converter 102 obtains an inverter modulation factor Iout_r from the magnitude of the output current command vector Io_ref and the radius of an inscribed circle related to the 2N or N nonzero current vectors having equal magnitudes, and obtains a current phase command θIout from an output current frequency command by integration, similarly to the inverter PWM calculation portion 521 of the power converter 100 according to the first embodiment. Further, the inverter PWM calculation portion decides durations $T_i$, $T_{i+1}$ and Tz of selected two nonzero current vectors and one zero current vector by employing a formula obtained by replacing π/3 with π/N (N: odd number) or 2π/N (N: even number) in the formula (5) and the formulas (6) and (7).

The converter PWM calculation portion of the power converter 102 also selects two nonzero current vectors adjacent to an input current command vector Ii_ref and one zero current vector and decides ON-/OFF-states of switches of 2M converters receiving the currents, similarly to the inverter PWM calculation portion. The converter PWM calculation portion further obtains a converter modulation factor Iin_r and a current phase command θIin, and decides durations $T_i$, $T_{i+1}$ and Tz of selected two nonzero current vectors and one zero current vector by employing a formula obtained by replacing π/3 with π/M (M: odd number) or 2π/M (M: even number) in the formula (5) and the formulas (6) and (7).

The driving signal distribution circuit of the power converter 102 selects a power conversion circuit from information, output from the converter PWM calculation portion of the power converter 102, as to which ones the two nonzero current vectors and one zero current vector are respectively. The power converter 102 has $M^2$ power conversion circuits, and hence the driving signal distribution circuit selects one of them. It follows that the driving signal distribution circuit selects one circuit structure of the power converter 102 having the M power conversion circuits. Then, the driving signal distribution circuit decides ON-/OFF-states of 2N one-way switches of the power conversion circuit selected in this manner according to the information, output from the converter PWM calculation portion of the power converter 102, as to which ones the two nonzero current vectors and one zero current vectors are respectively, and turns off all one-way switches of remaining M−1 current type inverters. The driving signal distribution circuit of the power converter 102 further outputs switch driving signals for 2MN one-way switches according to the durations Tz, $T_i$ and $T_{i+1}$ output from the inverter PWM calculation portion and the converter PWM calculation portion of the power converter 102 respectively.

Thus, the power converter 102 according to the third embodiment is a power converter driven by switch driving signals generated from current command vectors, similarly to an M-phase input N-phase output current type inverter.

The effects of the third embodiment are similar to those of the aforementioned first embodiment.

Fourth Embodiment

A power converter 103 according to a fourth embodiment of the present invention is now described with reference to FIG. 22. According to the fourth embodiment, the power converter 103 is provided with a current transformer 61 and a snubber circuit 62.

Figure 22:
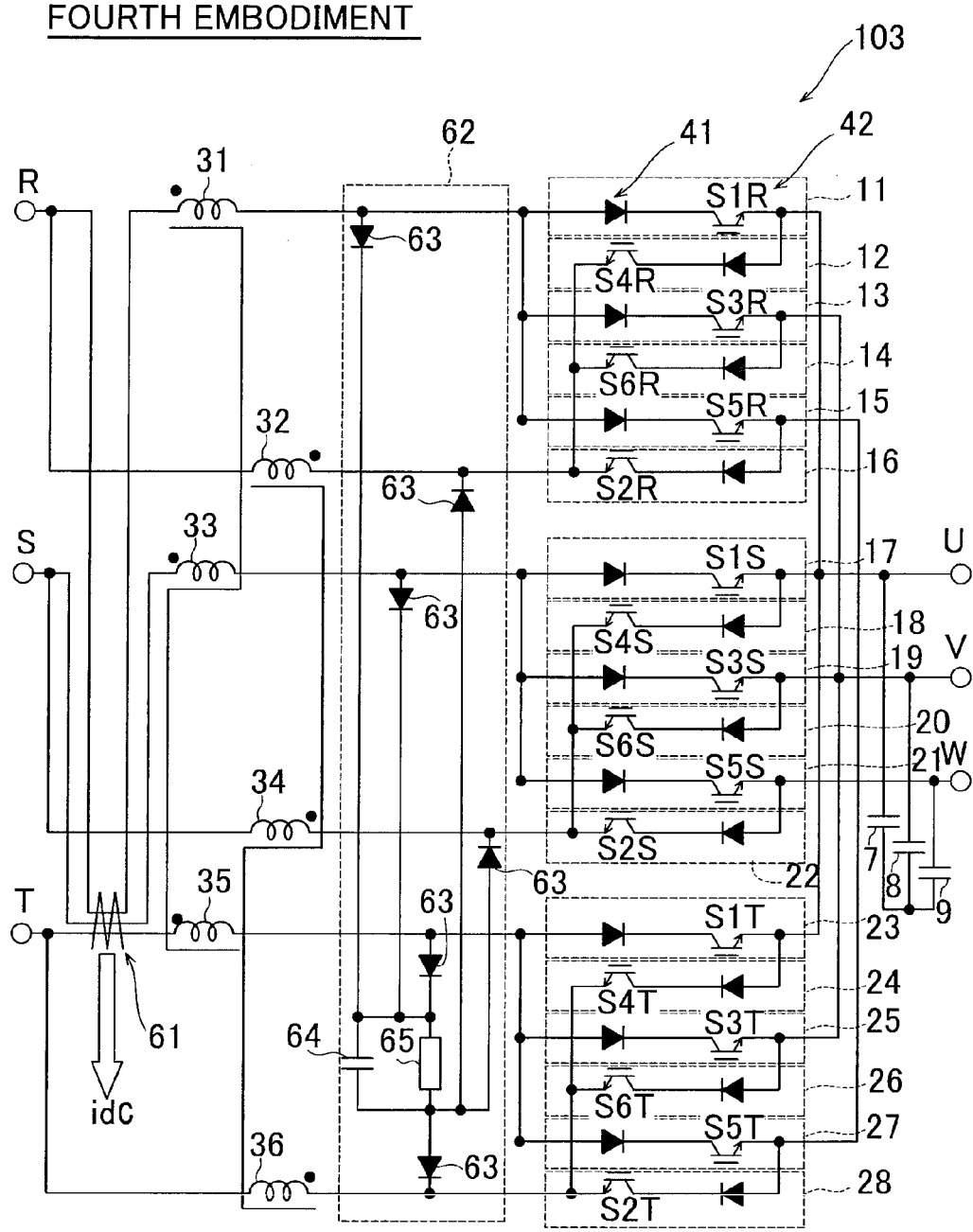
FIG. 22 is a circuit diagram of a power converter according to a fourth embodiment of the present invention.

In the power converter 103 according to the fourth embodiment, the current transformer 61 is provided between an R terminal and a direct current inductor 31, between an S terminal and a direct current inductor 33 and between a T terminal and a direct current inductor 35, as shown in FIG. 22. The current transformer 61 detects the sum of currents flowing in the direct current inductors 31, 33 and 35. A direct current idc regularly flows to any one of the direct current inductors 31, 33 and 35 as described with reference to the first embodiment, and hence the detected sum of the currents id equal to idc. Then, the current transformer 61 inputs the detected sum of the currents in a direct current command portion 513 (see FIG. 2), which in turn feedback-controls the direct current idc with the detected sum of the currents.

The snubber circuit 62 is provided between the direct current inductors 31 to 36 and one-way switches 11 to 28. The snubber circuit 62 includes six diodes 63, a capacitor 64 and a resistor 65. The degree of coupling of the direct current inductors 31 to 36 is smaller than one, and hence surge voltages are generated on windings when current paths of the direct current inductors 31 to 36 are switched from ON-states to OFF-states. The snubber circuit 62 has a function of suppressing the surge voltages. The remaining structure of the power converter 103 according to the fourth embodiment is similar to that of the power converter 100 according to the aforementioned first embodiment. The effects of the fourth embodiment are also similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

Figure 23:
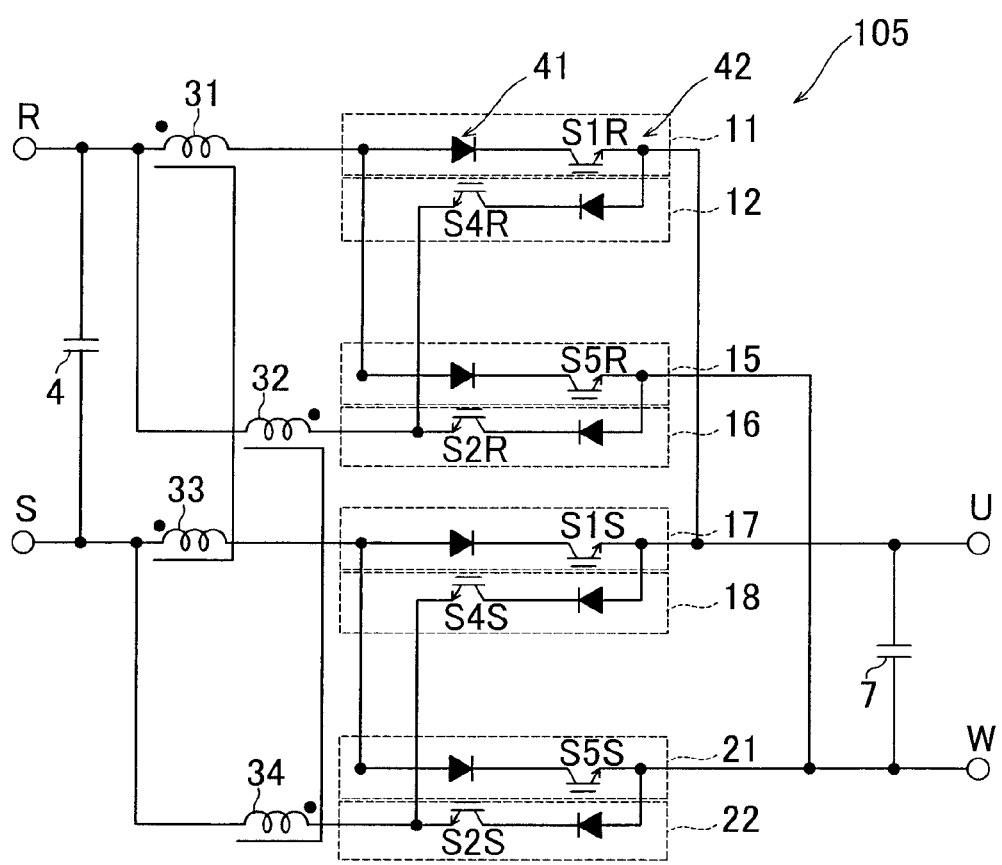
FIG. 23 is a circuit diagram of a power converter according to a modification of each of the first to fourth embodiments of the present invention.

For example, while the present invention is applied to the three-phase input three-phase output, two-phase input three-phase output or M-phase input N-phase output power converter in each of the aforementioned first to fourth embodiments, the present invention is not restricted to this. The present invention may alternatively be applied to a two-phase input two-phase output power converter 105 as shown in FIG. 23, for example. In this case, the power converter 105 converts direct currents to two-phase alternating currents and outputs them, and hence one current type inverter requires four (2 by 2) one-way switches. In the two-phase input two-phase output power converter 105, two current type inverter circuits are provided one by one as to each phase, and hence eight (2 by 2 by 2) one-way switches are provided in total.

Figure 24:
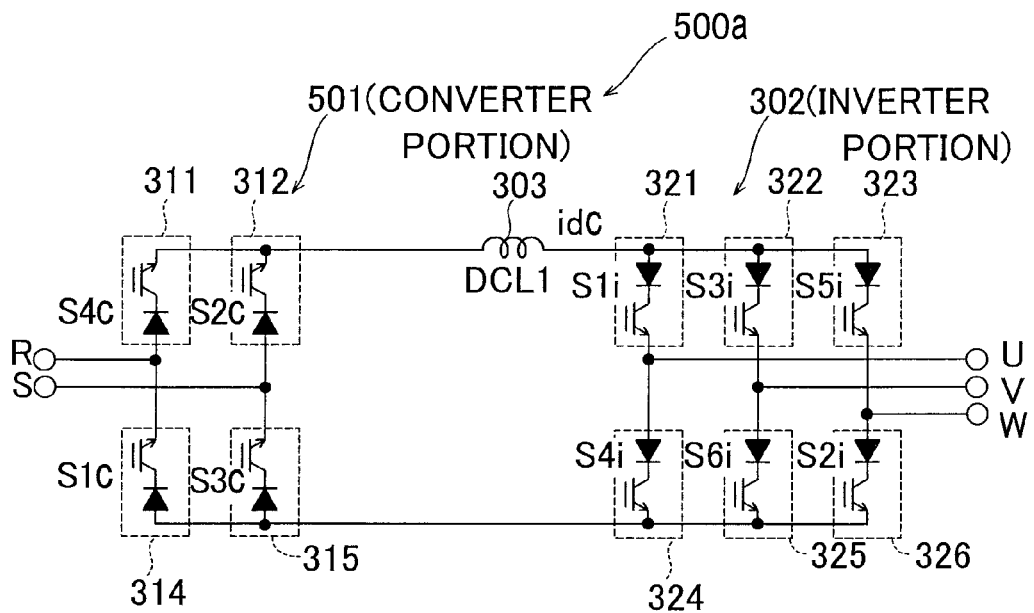
FIG. 24 is a circuit diagram of a current type inverter according to a first modification of the two-phase input three-phase output current type inverter shown in FIG. 15.

The general current type inverter circuit shown in FIG. 15 does not require both of the direct current inductors 303 and 304, but a current type inverter 500a may be provided with only one direct current inductor 303, as shown in FIG. 24. Therefore, while the coupled direct current inductors 31, 33 and 35 and the coupled direct current inductors 32, 34 and 36 are provided between the input terminals (R, S and T terminals) and the one-way switches in each of the aforementioned first to fourth embodiments, the present invention is not restricted to this. In the present invention, at least the coupled direct current inductors 31, 33 and 35 may simply be provided between the input terminals (R, S and T terminals) and the one-way switches.

Figure 25:
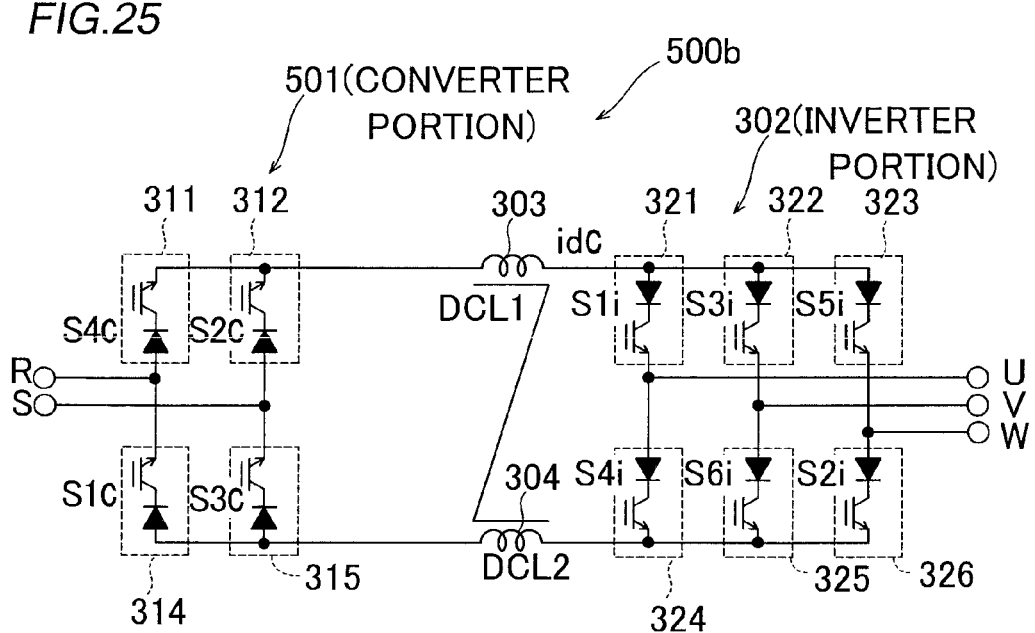
FIG. 25 is a circuit diagram of a current type inverter according to a second modification of the two-phase input three-phase output current type inverter shown in FIG. 15.

The direct current inductors 303 and 304 of the general current type inverter circuit shown in FIG. 15 may alternatively be coupled with each other, as in a current type inverter 500b shown in FIG. 25. Therefore, while the direct current inductors 31, 33 and 35 and the direct current inductors 32, 34 and 36 are separately coupled in each of the aforementioned first to fourth embodiments, the present invention is not restricted to this. For example, all of the direct current inductors 31 to 36 may alternatively be coupled in the directions of the black circles in FIG. 1.

While the one-way switches are formed by serially connecting the diodes and the transistors with each other in each of the aforementioned first to fourth embodiments, the transistors may be self-extinction transistors such as IGBTs. Further, only reverse-blocking transistors such as RB-IGBTs may be used, to omit the diodes.

What is claimed is:

1. A power converter comprising a power conversion portion which includes a plurality of one-way switches that connect input phases and each of output phases and inductors provided between said input phases and said plurality of one-way switches respectively, wherein
said plurality of one-way switches and said inductors are provided with respect to each said input phases,
said inductors are coupled with each other, and
said power conversion portion performs an operation of moving currents between closed circuits connected to windings of said coupled inductors on the basis of ON-/OFF-states of said plurality of one-way switches.

2. The power converter according to claim 1, wherein
said plurality of one-way switches provided on said power conversion portion include first one-way switches feeding currents from input-side terminals to output-side terminals and second one-way switches feeding currents from said output-side terminals to said input-side terminals, and
said inductors are provided at least between said input-side terminals and said first one-way switches.

3. The power converter according to claim 1, wherein
said inductors are provided not between said plurality of one-way switches and output-side terminals, but between input-side terminals and said plurality of one-way switches.

4. The power converter according to claim 1, further comprising a control portion controlling said ON-/OFF-states of said plurality of one-way switches and moving said currents between said windings of coupled said inductors.

5. The power converter according to claim 1, wherein
three power conversion portions are provided for receiving three phase alternating currents and outputting other three phase alternating currents.

6. The power converter according to claim 1, wherein
said plurality of one-way switches comprise diodes and transistors serially connected to said diodes respectively, and so formed that the power converter performs said operation of moving said currents between said windings of said coupled inductors on the basis of ON-/OFF-states of said transistors.

7. The power converter according to claim 1, further comprising a plurality of filter capacitors provided between input terminals of said power converter and said coupled inductors, wherein
first electrodes of said plurality of filter capacitors are connected to said input terminals, and second electrodes of said plurality of filter capacitors are connected with each other.

8. The power converter according to claim 1, further comprising a plurality of capacitors having first electrodes connected to output-side terminals of said power conversion portions, wherein
second electrodes of said plurality of capacitors are connected with each other.

9. The power converter according to claim 1, wherein
two power conversion portions are provided for receiving two phase alternating currents and outputting three phase alternating currents.

10. The power converter according to claim 1, wherein
two power conversion portions are provided for receiving two phase alternating currents and outputting other two phase alternating currents.

11. The power converter according to claim 1, wherein
M power conversion portions are provided for receiving an M phase alternating current and outputting an N phase alternating current, where M is defined as a natural number of at least two and N is defined as a natural number of at least two.

12. The power converter according to claim 1, further comprising a current transformer provided between input terminals of said power converter and said coupled inductors for detecting currents flowing in said coupled inductors.

13. The power converter according to claim 1, further comprising a snubber circuit provided between said coupled inductors and said plurality of one-way switches for suppressing a surge voltage generated when said currents move between said windings of said coupled inductors.

14. A power converter comprising a power conversion portion which includes a plurality of one-way switches that connect input phases and each of output chases and inductors provided between said input phases and said plurality of one-way switches respectively,
    wherein said plurality of one-way switches and said inductors are provided with respect to each said input phases,
    wherein said inductors are coupled with each other,
    said power conversion portion performs an operation of moving currents between windings of said coupled inductors on the basis of ON-/OFF-states of said plurality of one-way switches,
    wherein said plurality of one-way switches provided on said power conversion portion include first one-way switches feeding currents from input-side terminals to output-side terminals and second one-way switches feeding currents from said output-side terminals to said input-side terminals,
    wherein a first inductor is provided between one of said input-side terminals and said first one-way switches while a second inductor having opposite polarity of induced current from said first inductor is provided between the other of said input-side terminals and said second one-way switches, and
    wherein the power converter is formed to couple said first inductor with another said first inductor and to couple said second inductor with another said second inductor.

15. The power converter according to claim 14, wherein the winding numbers of respective windings of coupled said first inductors and the winding numbers of respective windings of coupled said second inductors are equal to each other.

16. The power converter according to claim 14, so formed that a direct current flows in any one of coupled said first inductors and another direct current flows in any one of coupled said second inductors on the basis of said ON-/OFF-states of said plurality of one-way switches.

17. A power converter comprising a power conversion portion which includes a plurality of one-way switches that connect input phases and each of output phases and inductors provided between said input phases and said plurality of one-way switches respectively,
    wherein said plurality of one-way switches and said inductors are provided with respect to each said input phases,
    wherein said inductors are coupled with each other,
    wherein said power conversion portion performs an operation of moving currents between windings of said coupled inductors on the basis of ON-/OFF-states of said plurality of one-way switches,
further comprising a control portion controlling said ON-/OFF-states of said plurality of one-way switches and moving said currents between said windings of coupled said inductors, and
wherein said control portion includes a first control portion generating signals driving a current type inverter including a converter portion and an inverter portion and outputting generated said signals as signals for generating signals for controlling said ON-/OFF-states of said plurality of one-way switches and a second control portion generating said signals for controlling said ON-/OFF-states of said plurality of one-way switches from signals output from said first control portion.

18. The power converter according to claim 17, wherein said second control portion is formed to generate said signals for controlling said ON-/OFF-states of said plurality of one-way switches by obtaining the logical product of signals driving said converter portion and other signals driving said inverter portion output from said first control portion.

19. The power converter according to claim 17, wherein said first control portion includes a current command portion generating a current command driving said current type inverter including said converter portion and said inverter portion and an calculation portion calculating a duration of an output current on the basis of said current command received from said current command portion.

20. The power converter according to claim 19, wherein said current command portion includes a converter current command portion generating a current command driving said converter portion and an inverter current command portion generating a current command driving said inverter portion, and
said calculation portion includes a converter calculation portion calculating a duration of a received current on the basis of said current command received from said converter current command portion and an inverter calculation portion calculating a duration of an output current on the basis of said current command received from said converter current command portion.

* * * * *